United States Patent
Yabu

(10) Patent No.: US 10,194,216 B2
(45) Date of Patent: *Jan. 29, 2019

(54) VIDEO RECEPTION DEVICE, VIDEO RECOGNITION METHOD, AND ADDITIONAL INFORMATION DISPLAY SYSTEM

(71) Applicant: Panasonic Intellectual Property Management Co., Ltd., Osaka (JP)

(72) Inventor: Hiroshi Yabu, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/890,121

(22) PCT Filed: Jul. 16, 2014

(86) PCT No.: PCT/JP2014/003760
§ 371 (c)(1),
(2) Date: Nov. 9, 2015

(87) PCT Pub. No.: WO2015/145491
PCT Pub. Date: Oct. 1, 2015

(65) Prior Publication Data
US 2016/0119690 A1    Apr. 28, 2016

(30) Foreign Application Priority Data
Mar. 26, 2014 (JP) .................. 2014-063497

(51) Int. Cl.
*H04H 60/32* (2008.01)
*H04N 21/81* (2011.01)
(Continued)

(52) U.S. Cl.
CPC ......... *H04N 21/816* (2013.01); *H04N 13/139* (2018.05); *H04N 13/178* (2018.05);
(Continued)

(58) Field of Classification Search
CPC ........................ H04N 21/237; H04N 21/437
(Continued)

(56) References Cited

U.S. PATENT DOCUMENTS 7,712,123 B2    5/2010    Miyaoku et al.
8,199,221 B2    6/2012    Yoshizumi
(Continued)

FOREIGN PATENT DOCUMENTS

EP    1286541 A1    2/2003
EP    1 954 041 A1    8/2008
(Continued)

OTHER PUBLICATIONS

International Search Report of PCT application No. PCT/JP2014/003760 dated Oct. 7, 2014.
(Continued)

*Primary Examiner* — Jivka A Rabovianski
(74) *Attorney, Agent, or Firm* — McDermott Will & Emery LLP

(57) ABSTRACT

Video recognition processing on stereoscopic video signals input from an outside is performed. Hence, a video reception device which is configured to transmit and receive data through a communication network includes an input unit, a video extraction unit, a stereoscopic signal generator which is a video signal generator, and a control unit. The stereoscopic signal generator generates, from a partial video extracted by the video extraction unit, stereoscopic video signals of a single method or a plurality of methods different from that of the partial video. The control unit generates content recognition information from at least one of the
(Continued)

partial video and the stereoscopic video signals generated by the stereoscopic signal generator, and requests a video recognition device to perform video recognition processing on the content recognition information.

9 Claims, 13 Drawing Sheets

(51) Int. Cl.
| | | |
|---|---|---|
| H04N 13/139 | (2018.01) | |
| H04N 13/194 | (2018.01) | |
| H04N 13/178 | (2018.01) | |
| H04N 21/237 | (2011.01) | |
| H04N 21/437 | (2011.01) | |
| H04N 21/44 | (2011.01) | |

(52) U.S. Cl.
CPC ......... *H04N 13/194* (2018.05); *H04N 21/237* (2013.01); *H04N 21/437* (2013.01); *H04N 21/44008* (2013.01); *H04N 21/812* (2013.01); *H04N 21/8133* (2013.01)

(58) Field of Classification Search
USPC ...................................... 725/19, 12, 32, 109
See application file for complete search history.

(56) References Cited

U.S. PATENT DOCUMENTS

| | | | |
|---|---|---|---|
| 8,254,720 | B2 | 8/2012 | Matsuzaki |
| 8,421,921 | B1 | 4/2013 | Woodall |
| 8,582,952 | B2 | 11/2013 | Circlaeys et al. |
| 9,148,610 | B2 | 9/2015 | Yabu |
| 9,456,237 | B2 | 9/2016 | Oztaskent et al. |
| 9,626,798 | B2 * | 4/2017 | Zavesky ............... G06T 19/006 |
| 2002/0001453 | A1 | 1/2002 | Mizumura et al. |
| 2002/0097339 | A1 | 7/2002 | Kwon |
| 2002/0126990 | A1 | 9/2002 | Rasmussen et al. |
| 2002/0143902 | A1 | 10/2002 | Chung et al. |
| 2003/0051252 | A1 | 3/2003 | Miyaoku et al. |
| 2003/0084462 | A1 | 5/2003 | Kubota et al. |
| 2003/0149983 | A1 | 8/2003 | Markel |
| 2004/0165865 | A1 | 8/2004 | Seo et al. |
| 2005/0071425 | A1 | 3/2005 | Chung et al. |
| 2005/0172312 | A1 | 8/2005 | Lienhart et al. |
| 2006/0187358 | A1 | 8/2006 | Lienhart et al. |
| 2006/0200842 | A1 | 9/2006 | Chapman et al. |
| 2007/0157242 | A1 | 7/2007 | Cordray et al. |
| 2007/0233285 | A1 | 10/2007 | Yamamoto |
| 2007/0261079 | A1 | 11/2007 | Pack et al. |
| 2008/0181515 | A1 | 7/2008 | Kondo |
| 2008/0310731 | A1 | 12/2008 | Stojancic et al. |
| 2009/0006375 | A1 | 1/2009 | Lax et al. |
| 2009/0034937 | A1 | 2/2009 | Kusunoki et al. |
| 2009/0177758 | A1 | 7/2009 | Banger et al. |
| 2009/0244372 | A1 | 10/2009 | Petronelli et al. |
| 2009/0279738 | A1 | 11/2009 | Sasaki |
| 2010/0067873 | A1 * | 3/2010 | Sasaki ................... G11B 27/105 |
| | | | 386/241 |
| 2010/0259684 | A1 | 10/2010 | Kambe |
| 2010/0318515 | A1 | 12/2010 | Ramanathan et al. |
| 2011/0078202 | A1 | 3/2011 | Kamibeppu |
| 2011/0129017 | A1 | 6/2011 | Oami et al. |
| 2011/0135283 | A1 | 6/2011 | Poniatowki et al. |
| 2011/0137976 | A1 * | 6/2011 | Poniatowski .... H04N 21/42203 |
| | | | 709/203 |
| 2011/0181693 | A1 | 7/2011 | Lee et al. |
| 2011/0243474 | A1 | 10/2011 | Ito |
| 2011/0246202 | A1 | 10/2011 | McMillan et al. |
| 2011/0247042 | A1 | 10/2011 | Mallinson |
| 2012/0020568 | A1 | 1/2012 | Kogane |
| 2012/0075421 | A1 * | 3/2012 | Tsukagoshi ............. H04N 13/0059 |
| | | | 348/43 |
| 2012/0092248 | A1 | 4/2012 | Prabhala |
| 2012/0128241 | A1 | 5/2012 | Jung |
| 2012/0320091 | A1 | 12/2012 | Rajaraman et al. |
| 2012/0321125 | A1 | 12/2012 | Choi et al. |
| 2013/0042289 | A1 | 2/2013 | Park |
| 2013/0047178 | A1 | 2/2013 | Moon et al. |
| 2013/0054645 | A1 | 2/2013 | Bhagavathy et al. |
| 2013/0094590 | A1 * | 4/2013 | Laksono ............... H04N 19/44 |
| | | | 375/240.25 |
| 2013/0106999 | A1 * | 5/2013 | Newton ............... H04N 13/004 |
| | | | 348/43 |
| 2013/0111514 | A1 | 5/2013 | Slavin et al. |
| 2013/0127990 | A1 * | 5/2013 | Lin ....................... H04N 13/139 |
| | | | 348/43 |
| 2013/0129219 | A1 | 5/2013 | Takenouchi et al. |
| 2013/0145395 | A1 | 6/2013 | Jeong et al. |
| 2013/0167189 | A1 | 6/2013 | Lucas |
| 2013/0198773 | A1 | 8/2013 | Jentz et al. |
| 2013/0202150 | A1 | 8/2013 | Sinha et al. |
| 2013/0205321 | A1 | 8/2013 | Sinha et al. |
| 2013/0230292 | A1 | 9/2013 | Pierce et al. |
| 2013/0246457 | A1 | 9/2013 | Stojancic et al. |
| 2013/0247117 | A1 | 9/2013 | Yamada et al. |
| 2013/0254802 | A1 | 9/2013 | Lax et al. |
| 2013/0308818 | A1 | 11/2013 | MacIntosh et al. |
| 2014/0007155 | A1 | 1/2014 | Vemparala et al. |
| 2014/0082655 | A1 | 3/2014 | Moon et al. |
| 2014/0123204 | A1 | 5/2014 | Moon et al. |
| 2014/0229485 | A1 | 8/2014 | Icho et al. |
| 2014/0230002 | A1 | 8/2014 | Kitazato |
| 2015/0020094 | A1 | 1/2015 | Moon et al. |
| 2015/0026718 | A1 | 1/2015 | Seyller |
| 2015/0193451 | A1 | 7/2015 | Rowe |

FOREIGN PATENT DOCUMENTS

| | | |
|---|---|---|
| EP | 2 244 208 A2 | 10/2010 |
| EP | 2337345 A1 | 6/2011 |
| EP | 2760200 A1 | 7/2014 |
| EP | 2763427 A1 | 8/2014 |
| JP | H04-245552 A | 9/1992 |
| JP | H09-185720 A | 7/1997 |
| JP | H10-126721 A | 5/1998 |
| JP | 10-214258 | 8/1998 |
| JP | 2000-293626 A | 10/2000 |
| JP | 2002-175311 A | 6/2002 |
| JP | 2002-209204 | 7/2002 |
| JP | 2002-232372 A | 8/2002 |
| JP | 2002-334010 A | 11/2002 |
| JP | 2000-287189 A | 10/2003 |
| JP | 2004-007323 | 1/2004 |
| JP | 2004-104368 | 4/2004 |
| JP | 2004-303259 A | 10/2004 |
| JP | 2004-341940 A | 12/2004 |
| JP | 2005-167452 A | 6/2005 |
| JP | 2005-167894 A | 6/2005 |
| JP | 2005-347806 A | 12/2005 |
| JP | 2006-030244 A | 2/2006 |
| JP | 2006-303936 A | 11/2006 |
| JP | 2007-049515 A | 2/2007 |
| JP | 2007-134948 A | 5/2007 |
| JP | 2008-040622 A | 2/2008 |
| JP | 2008-042259 A | 2/2008 |
| JP | 2008-116792 A | 5/2008 |
| JP | 2008-176396 A | 7/2008 |
| JP | 2008-187324 A | 8/2008 |
| JP | 2009-088777 A | 4/2009 |
| JP | 2010-164901 A | 7/2010 |
| JP | 2010-271987 A | 12/2010 |
| JP | 2011-034323 A | 2/2011 |
| JP | 2011-059504 A | 3/2011 |
| JP | 2011-234343 A | 11/2011 |
| JP | 2012-055013 A | 3/2012 |
| JP | 2012-231383 A | 11/2012 |
| JP | 2013-038773 A | 2/2013 |
| JP | 2013-070268 A | 4/2013 |
| JP | 2013-125191 A | 6/2013 |
| JP | 2013-164753 A | 8/2013 |
| WO | 2004/080073 A2 | 9/2004 |

(56) References Cited

FOREIGN PATENT DOCUMENTS

| WO | 2007/039994 A1 | 4/2007 |
|---|---|---|
| WO | 2009/011030 A1 | 1/2009 |
| WO | 2010/022000 A2 | 2/2010 |
| WO | 2013/042531 A1 | 3/2013 |
| WO | 2013/047948 A1 | 4/2013 |
| WO | 2013/103273 A1 | 7/2013 |
| WO | 2013/119082 A1 | 8/2013 |
| WO | 2014/006903 A1 | 1/2014 |

OTHER PUBLICATIONS

Non-Final Office Action issued in U.S. Appl. No. 14/787,721, dated Aug. 4, 2016.
Final Office Action issued in U.S. Appl. No. 14/787,721, dated Dec. 2, 2016.
Non-Final Office Action issued in U.S. Appl. No. 14/787,759, dated Dec. 29, 2016.
Non-Final Office Action issued in U.S. Appl. No. 14/888,444, dated Oct. 6, 2016.
Non-Final Office Action issued in U.S. Appl. No. 14/888,447, dated Sep. 6, 2016.
Final Office Action issued in U.S. Appl. No. 14/888,447, dated Jan. 10, 2017.
Non-Final Office Action issued in U.S. Appl. No. 14/888,449, dated Nov. 21, 2016.
Non-Final Office Action issued in U.S. Appl. No. 14/888,445, dated Aug. 12, 2016.
The Extended European Search Report dated Jul. 5, 2016 for the related European Patent Application No. 14829140.4.
The Extended European Search Report dated Jun. 14, 2016 for the related European Patent Application No. 14832570.7 (with English translation).
The Extended Search Report dated Jul. 8, 2016 for the related Europena Patent Application No. 14838764.0.
The Extended European Search Report dated Jul. 19, 2016, for the related European Patent Application No. 14838765.7.
International Search Report of PCT application No. PCT/JP2014/003526 dated Oct. 7, 2014 (with English translation).
International Search Report of PCT application No. PCT/JP2014/003546 dated Oct. 7, 2014 (with English translation).
International Search Report issued in International Patent Application No. PCT/JP2014/003548, dated Oct. 7, 2014 (with English translation).
International Search Report of International Patent Application No. PCT/JP2014/003761, dated Oct. 21, 2014 (with English translation).
International Search Report of International Patent Application No. PCT/JP2014/003762, dated Oct. 21, 2014 (with English translation).
International Search Report of International Patent Application No. PCT/JP2014/003547, dated Oct. 7, 2014 (with English translation).
International Search Report of International Patent Application No. PCT/JP2015/004112, dated Oct. 27, 2015 (with English translation).
International Search Report of International Patent Application No. PCT/JP2015/003527, dated Aug. 11, 2015 (with English translation).
International Search Report of International Patent Application No. PCT/JP2015/004187, dated Oct. 20, 2015 (with English translation).
Gonzales R et al: "Digital Image Processing, Matching by correlation", Dec. 31, 2002 (Dec. 31, 2002), Digital Image Processing, Prentice-Hall Upper Saddle River, New Jersey, pp. 701-704, XP002657364.
Template matching, Wikipedia, Mar. 11, 2013 (Mar. 11, 2013), XP002759268, Retrieved from the Internet: URL:https://en.wikipedia.org/w/index.php?title=Template_matching&oldid=543510371 [retrieved on-Jun. 28, 2016].
Non-Final Office Action issued in U.S. Appl. No. 14/787,721, dated Jun. 7, 2017.
Notice of Allowance issued in U.S. Appl. No. 14/787,759, dated May 9, 2017.
Final Office Action issued in U.S. Appl. No. 14/888,444, dated May 15, 2017.
Final Office Action issued in U.S. Appl. No. 14/888,449, dated Mar. 6, 2017.
Final Office Action issued in U.S. Appl. No. 14/888,445, dated Jan. 30, 2017.
Non-Final Office Action issued in U.S. Appl. No. 14/888,445, dated Jun. 9, 2017.
Non-Final Office Action issued in related U.S. Appl. No. 13/958,863, dated Aug. 14, 2014.
Final Office Action issued in related U.S. Appl. No. 13/958,863, dated Jan. 23, 2015.
The Extended European Search Report dated Feb. 28, 2017 for the related European Patent Application No. 14841401.4.
The Extended European Search Report dated Mar. 3, 2017 for the related European Patent Application No. 14841377.6.
Notice of Allowance issued in U.S. Appl. No. 14/888,447, dated Jul. 3, 2017.
Non-Final Office Action issued in U.S. Appl. No. 14/888,449, dated Jul. 5, 2017.
The Extended European Search Report dated May 29, 2017 for the related European Patent Application No. 15832982.1.
The Extended European Search Report dated May 11, 2017 for the related European Patent Application No. 15822221.6.
Notice of Allowance issued in U.S. Appl. No. 14/888,449, dated Nov. 24, 2017.
Notice of Allowance issued in U.S. Appl. No. 14/888,445, dated Nov. 20, 2017.
Notice of Allowance issued in U.S. Appl. No. 14/787,721, dated Dec. 18, 2017.
Non-Final Office Action issued in U.S. Appl. No. 15/302,460, dated Dec. 20, 2017.
Notice of Allowance issued in U.S. Appl. No. 14/888,444, dated Oct. 2, 2017.
Non-Final Office Action issued in U.S. Appl. No. 15/301,444, dated Jan. 26, 2018.
Final Office Action issued in related U.S. Appl. No. 15/302,460 dated Jul. 26, 2018.

* cited by examiner

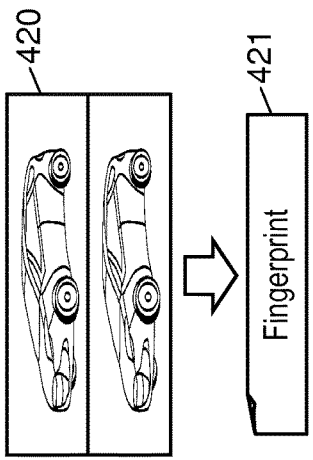
FIG. 7C
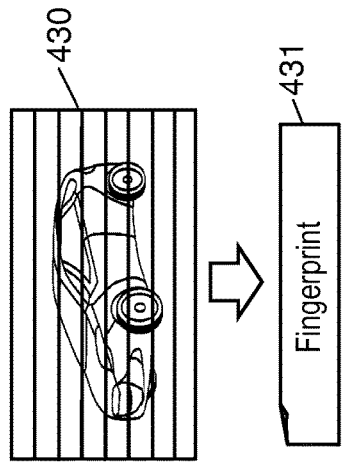
FIG. 7D
FIG. 7A
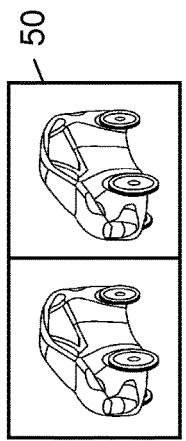
FIG. 7B
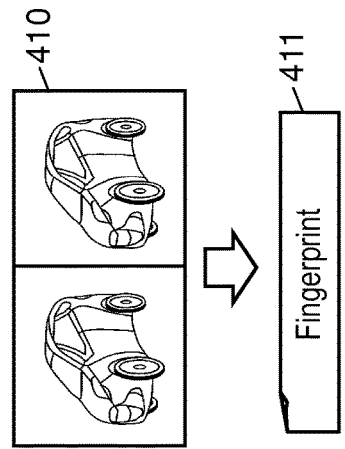

VIDEO RECEPTION DEVICE, VIDEO RECOGNITION METHOD, AND ADDITIONAL INFORMATION DISPLAY SYSTEM

CROSS-REFERENCE TO RELATED APPLICATIONS

This application is a U.S. national stage application of the PCT International Application No. PCT/JP2014/003760 filed on Jul. 16, 2014, which claims the benefit of foreign priority of Japanese patent application 2014-063497 filed on Mar. 26, 2014, the contents all of which are incorporated herein by reference.

TECHNICAL FIELD

The present disclosure relates to a video reception device which obtains additional information related to video signals input from an outside, and superimposes the additional information on the video signals.

BACKGROUND ART

Patent Literature 1 discloses a data processing system. In this system, a client device transmits video data to a server device which is a video recognition device through a network, and requests the server device to perform video recognition processing. The server device performs video recognition based on the received video data, and transmits a video recognition result to the client device through the network.

CITATION LIST

Patent Literature

PTL 1: Unexamined Japanese Patent Publication No. H10-214258

SUMMARY

The present disclosure provides a video reception device, a video recognition method and an additional information display system which are effective to obtain additional information related to video signals input from an outside, and superimpose the obtained additional information on the video signals.

The video reception device according to the present disclosure is configured to transmit and receive data through a communication network, and includes an input unit, a video extraction unit, a video signal generator and a control unit. The input unit is configured to receive an input of a video signal of a stereoscopic video output from a video transmission device installed outside. The video extraction unit is configured to extract a partial video for video recognition processing, from the video signal. The video signal generator is configured to generate, from the partial video, stereoscopic video signals of a single method or a plurality of methods different from that of the partial video. The control unit is configured to perform control of generating content recognition information from at least one of the partial video and the single stereoscopic video signal or the plurality of stereoscopic video signals generated by the video signal generator, transmitting the content recognition information to a video recognition device connected to the communication network so as to request the video recognition device to perform video recognition processing, obtaining a result of the video recognition processing from the video recognition device, and obtaining additional information based on the result of the video recognition processing from an additional information distribution device connected to the communication network.

A video recognition method according to the present disclosure is a video recognition method of a video reception device configured to transmit and receive data through a communication network, and includes: extracting a partial video for video recognition processing, from a video signal of a stereoscopic video input from an outside; generating, from the partial video, stereoscopic video signals of a single method or a plurality of methods different from that of the partial video; generating content recognition information from at least one of the partial video and the single generated stereoscopic video signal or the plurality of generated stereoscopic video signals; transmitting the content recognition information to a video recognition device connected to the communication network so as to request the video recognition device to perform the video recognition processing, and obtaining a result of the video recognition processing from the video recognition device; and obtaining additional information based on the result of the video recognition processing, from an additional information distribution device connected to the communication network.

An additional information display system according to the present disclosure includes a video reception device, a video recognition device and an additional information distribution device configured to transmit and receive data to each other through a communication network. The video reception device includes an input unit, a video extraction unit, a video signal generator and a control unit. The input unit is configured to receive an input of a video signal of a stereoscopic video output from a video transmission device installed outside. The video extraction unit is configured to extract a partial video for video recognition, from the video signal. The video signal generator is configured to generate, from the partial video, stereoscopic video signals of a single method or a plurality of methods different from that of the partial video. The control unit is configured to perform control of generating content recognition information from at least one of the partial video and the single stereoscopic video signal or the plurality of stereoscopic video signals generated by the video signal generator, transmitting the content recognition information to a video recognition device through the communication network so as to request the video recognition device to perform video recognition processing, obtaining a result of the video recognition processing from the video recognition device through the communication network, and obtaining additional information based on the result of the video recognition processing from the additional information distribution device through the communication network. The video recognition device is configured to perform the video recognition processing on the content recognition information received through the communication network, and transmit the result of the video recognition processing to the video reception device through the communication network. The additional information distribution device is configured to transmit additional information corresponding to the result of the video recognition processing received through the communication network, to the video reception device through the communication network.

BRIEF DESCRIPTION OF DRAWINGS

FIG. 7A is a schematic view schematically illustrating an example of 3D video signals output from a STB which is an example of a video transmission device and input to the video reception device.

FIG. 7B is a schematic view schematically illustrating an example of a partial video extracted from 3D video signals by a video extraction unit of the video reception device according to the first exemplary embodiment.

FIG. 7C is a schematic view schematically illustrating an example of a partial video of 3D video signals generated from a partial video by a stereoscopic signal generator of the video reception device according to the first exemplary embodiment.

FIG. 7D is a schematic view schematically illustrating an example of a partial video of 3D video signals generated from the partial video by the stereoscopic signal generator of the video reception device according to the first exemplary embodiment.

DESCRIPTION OF EMBODIMENTS

Exemplary embodiments will be described in detail below optionally with reference to the drawings. However, the exemplary embodiments will not be described in detail more than necessary in some cases. For example, in some cases, matters which have already been well known will not be described in detail, and substantially same components will not be described again. This is to prevent the following description from being redundant more than necessary, and help one of ordinary skill in the art understand the following description.

In addition, the accompanying drawings and the following description are provided to make it easy for one of ordinary skill in the art to sufficiently understand the present disclosure, and it is not intended to limit the subject matters recited in the claims by the drawings and the description.

First Exemplary Embodiment

The first exemplary embodiment will be described below with reference to FIGS. 1 to 7.

1-1. Configuration 1-1-1. Outline of System Configuration

Figure 1:
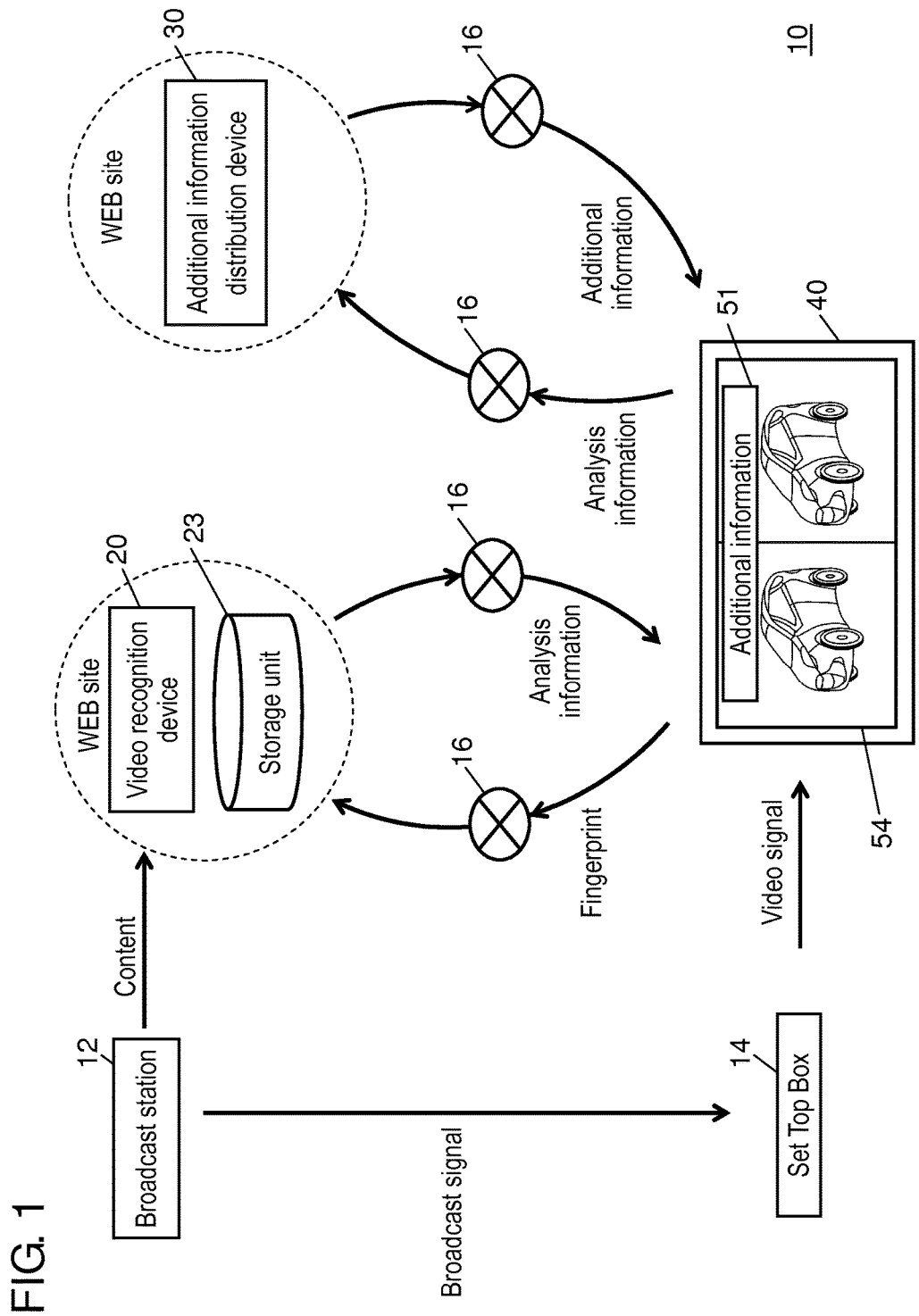
FIG. 1 is a view schematically illustrating an example of a configuration of an additional information display system according to a first exemplary embodiment.

FIG. 1 is a view schematically illustrating an example of a configuration of additional information display system 10 according to the first exemplary embodiment. Additional information display system 10 includes broadcast station 12, STB (Set Top Box) 14 which is a video transmission device, video recognition device 20, additional information distribution device 30 and video reception device 40. Additional information display system 10 is a communication system which is configured to specify which content a video received by video reception device 40 is using a video recognition technique of video recognition device 20, obtain additional information related to the content from additional information distribution device 30, and display the additional information on video reception device 40.

Video reception device 40, video recognition device 20 and additional information distribution device 30 are connected with each other through communication network 16.

Communication network 16 is configured as a wired network, a wireless network or a combination of wired and wireless networks. Communication network 16 is, for example, the Internet, yet may be an intranet, a commercial line, other communication lines or a combination of the intranet, the commercial line and communication lines.

Video reception device 40 and STB 14 are connected with each other through a communication interface. The communication interface is, for example, a HDMI (registered trademark) (High-Definition Multimedia Interface) yet may be a video cable or a wireless communication interface such as Wi-Fi (registered trademark), Bluetooth (registered trademark) or a wireless LAN (Local Area Network).

Broadcast station 12 is a transmission device which is configured to transmit (broadcast) broadcast signals. Broadcast station 12 broadcasts a television program including a main program and commercial messages (CM) by converting the television program into video signals, and superimposing the video signals on broadcast signals. The main program and the CMs are switched to each other as time passes. A main program and CMs will be referred to as "content" below. That is, broadcast station 12 broadcasts content which is switched as time passes. In addition, the transmission device is by no means limited to broadcast station 12, and only needs to transmit or broadcast content which is switched as time passes.

Further, when content to broadcast includes unique features, broadcast station 12 broadcasts or transmits information including information (referred to as "feature information" below) indicating the content or features of video signals of the content, together with the video signals. This information including the feature information will be referred to as "content related information" below. Content including unique features is, for example, content of stereoscopic images (which are 3 Dimensional video images and will be also referred to as a "3D video". Further, video signals of the 3D video will be also referred to as "3D video signals"), content including a video on which a caption is superimposed or the like. The content related information related to a 3D video includes feature information related to, for example, a transmission method of 3D video signals (a side-by-side method, a top-and-bottom method, a line-by-line method, a frame sequential method or the like). Further, the content related information related to a caption includes feature information related to, for example, whether or not there is a caption, a position and a size of the caption, a color of the caption, a font and the like. Furthermore, in some cases, the content related information includes feature information related to a broadcast format of broadcast signals.

In the present exemplary embodiment, an operation of additional information display system 10 when broadcast station 12 broadcasts content of a 3D video will be described.

STB 14 is a receiver (tuner) which is configured to receive broadcast signals (broadcast signals including 3D video signals) broadcast from broadcast station 12 and extract the video signals (3D video signals). STB 14 may have a function of decoding the received video signals when, for example, broadcast station 12 broadcasts digital video signals. STB 14 receives a channel selected from a plurality of channels broadcast by broadcast station 12 according to a user's instruction, and outputs video signals of this channel to video reception device 40 through the communication interface (e.g. the HDMI (registered trademark)). Further, STB 14 can also receive content related information and output this content related information to video reception device 40 when broadcast station 12 transmits the content related information together with video signals. In addition, the video transmission device is by no means limited to STB 14, and may be a recording device or the like which has, for example, a recording function, a broadcast signal receiving function and a video signal output function.

In addition, STB 14 may be configured to convert 3D video signals broadcast from broadcast station 12 into 3D video signals of another method, and output the 3D video signals to video reception device 40. STB 14 may be configured to, when, for example, broadcast station 12 broadcasts 3D video signals of the top-and-bottom method which is one example of the transmission method of 3D video signals (also referred to as a "3D video method" below), convert the 3D video signals into 3D video signals of the side-by-side method which is another example of the 3D video method and then output the 3D video signals to video reception device 40.

Further, STB 14 may be configured to, when broadcast station 12 broadcasts content including unique features, detect the features, generate content related information including feature information indicating the features, and output the content related information to video reception device 40. STB 14 may be configured to, when, for example, broadcast station 12 broadcasts content of a 3D video, detect a transmission method of 3D video signals, generate feature information indicating the detection result (the 3D video method) and output the feature information to video reception device 40. Alternatively, STB 14 may be configured to, when broadcast station 12 broadcasts content including a video on which a caption is superimposed, detect this caption, generate feature information indicating a display position and a display size of the detected caption and output the feature information to video reception device 40. Alternatively, STB 14 may be configured to, when superimposing a caption or an OSD (On Screen Display) on video signals, generate feature information related to a display position and a display size of the caption or the OSD, and output the feature information to video reception device 40. In addition, in the present exemplary embodiment, these pieces of feature information which a video transmission device such as STB 14 generates by detecting features of video signals broadcast by broadcast station 12 and outputs are also regarded as part of content related information.

Video reception device 40 is a video reception device which is configured to display, on displaying unit 54, a video based on video signals input from an outside, and is, for example, a television receiver. Video reception device 40 is configured to, when receiving an input of 3D video signals from the outside, also be able to display a 3D video based on the 3D video signals on displaying unit 54. Video reception device 40 is connected to communication network 16, and can transmit and receive data to and from video recognition device 20 and additional information distribution device 30 through communication network 16.

Video reception device 40 according to the present exemplary embodiment is configured to perform the following operations. Video reception device 40 performs content specifying processing (content specifying processing based on video recognition processing) on video signals input from the video transmission device (e.g. STB 14) through a communication interface using video recognition device 20. The content specifying processing refers to processing of specifying content represented by video signals. Video reception device 40 receives analysis information transmitted as a content specifying processing result from video recognition device 20, obtains additional information (e.g. advertisement information) related to the content from additional information distribution device 30 based on this analysis information, superimposes the obtained additional information on the video signals, and displays the additional information on displaying unit 54.

More specifically, video reception device 40 cyclically extracts a partial video by cyclically clipping part of input video signals, and transmits content recognition information generated from the partial video, and a content specifying processing (the content specifying processing based on the video recognition processing) request (also referred to as a "video recognition request" below) to video recognition device 20 through communication network 16. Further, video reception device 40 obtains the content specifying processing result (analysis information) of the content recognition information from video recognition device 20 through communication network 16. Furthermore, video reception device 40 obtains the additional information related to the obtained content specifying processing result (analysis information) from additional information distribution device 30 through communication network 16. Still further, video reception device 40 superimposes an image (indicated as "additional information 51" in FIG. 1) which is based on the obtained additional information, on a video which is being displayed on displaying unit 54. Details of the above will be described later.

Further, video reception device 40 can also receive content related information output from STB 14. In some cases, this content related information includes feature information indicating a transmission method of 3D video signals when, for example, broadcast station 12 broadcasts 3D video content. In some cases, this content related information includes feature information indicating a location (coordinate) and a size of a region on which a caption is superimposed when a video on which the caption is superimposed is included in content broadcast from broadcast station 12. Further, in some cases, when STB 14 superimposes a caption or an OSD on video signals, the content related information includes feature information indicating a location (coordinate) or a size of a region on which the caption or the OSD is superimposed.

In addition, an example where content recognition information is a fingerprint will be described in the present exemplary embodiment and subsequent exemplary embodiments. The content recognition information is information for recognizing a video, and the fingerprint is a hash value of each image which configures a partial video or a moving image. However, the content recognition information only needs to be information (data) which can be used for video recognition processing, and is by no means limited to a fingerprint (hash value).

In addition, in the present exemplary embodiment, an example where additional information is "advertisement information related to content" will be described. However, the additional information is by no means limited to advertisement information and may be, for example, tourist information, history information, personal profile information, a URL (Uniform Resource Locator), public bulletin information, information related to a program which is being broadcast and social information such as Twitter (registered trademark).

Video recognition device 20 is a server device connected to communication network 16, and is a website which performs content specifying processing based on video recognition processing. The content specifying processing is processing of performing video recognition processing based on a received fingerprint as described above, and specifying content represented by the fingerprint based on the video recognition processing result. Hence, video recognition device 20 analyzes the content broadcast by broadcast station 12, and performs video recognition processing using this analysis result.

Figure 2:
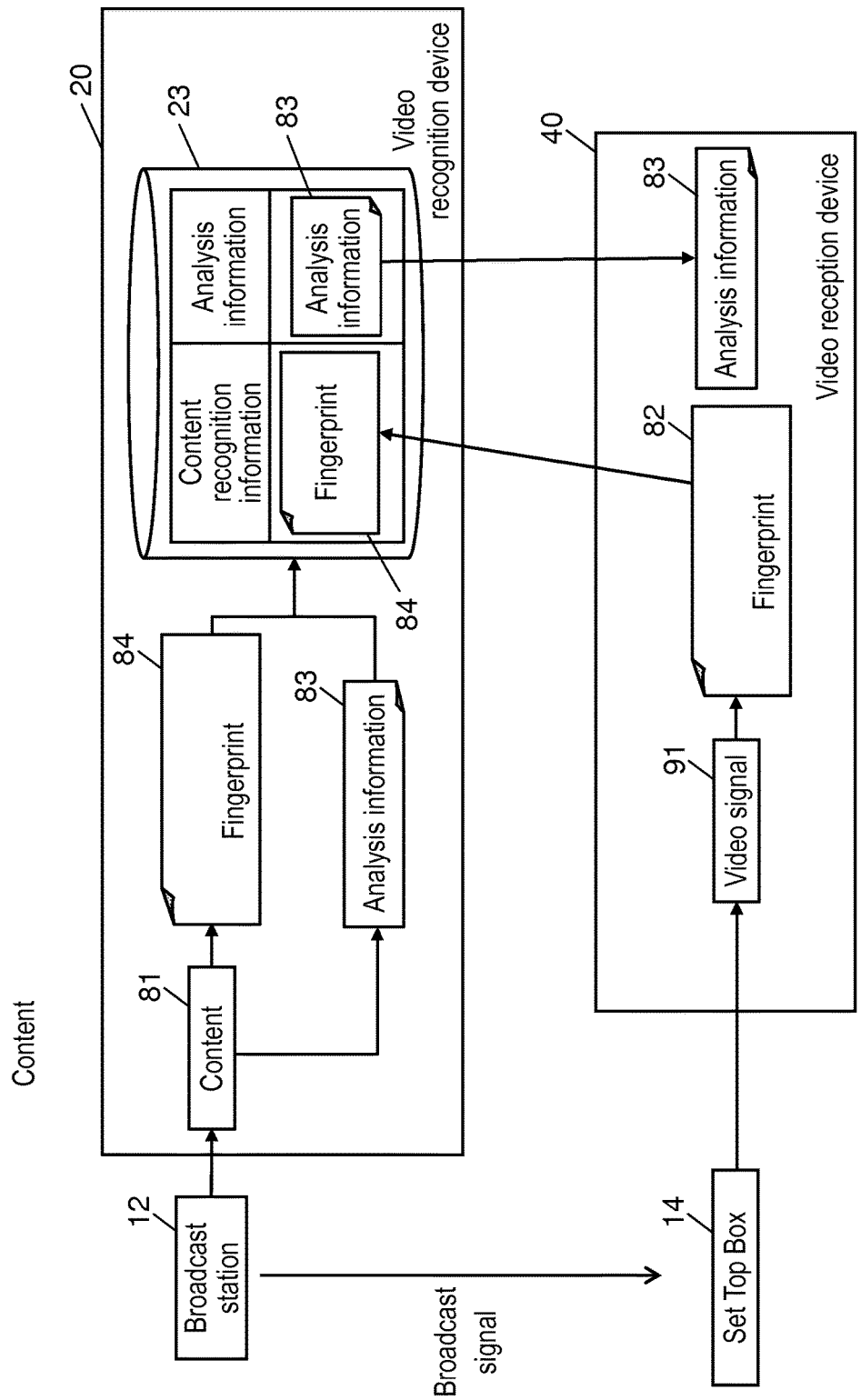
FIG. 2 is a schematic view schematically illustrating an example of an operation of a video recognition device according to the first exemplary embodiment.

An example of an operation of video recognition device 20 will be described with reference to FIG. 2. FIG. 2 is a schematic view schematically illustrating an example of an operation of video recognition device 20 according to the first exemplary embodiment. In addition, FIG. 2 schematically illustrates signal and information flows, and does not illustrate a configuration of a circuit block.

Video recognition device 20 obtains substantially all items of content 81 broadcast from broadcast station 12. This content 81 includes 3D video content, too. Further, video recognition device 20 analyzes obtained content 81, checks a time, a volume, a broadcast format, details, a genre, characters, a time table or the like of the content, and creates analysis information 83. Furthermore, video recognition device 20 creates fingerprint 84 from video signals of content 81 obtained from broadcast station 12. Video recognition device 20 may obtain content 81 by receiving broadcast signals broadcast from the broadcast station, or may obtain content 81 by receiving video signals transmitted from broadcast station 12 through a dedicated video line or the like. Further, this analysis may be performed, for example, automatically or manually by an operator. Analysis information 83 which is this analysis result and fingerprint 84 are stored together with information related to content 81 in storage unit 23 of video recognition device 20.

When receiving a video recognition request accompanied by fingerprint 82 (a fingerprint generated from a partial video of video signal 91 output from STB 14) transmitted from video reception device 40 through communication network 16, video recognition device 20 cross-checks this fingerprint 82 and fingerprints 84 generated in advance by video recognition device 20 and stored in storage unit 23 (video recognition processing) and specifies the content corresponding to this fingerprint 82. Thus, video recognition device 20 performs content specifying processing of determining from what content of a partial video fingerprint 82 transmitted from video reception device 40 is generated, and specifying the content. Further, video recognition device 20 reads an analysis result (analysis information 83) related to the specified content from storage unit 23, and returns read analysis information 83 as the content specifying processing result to video reception device 40 through communication network 16.

Video recognition processing based on such a method (content specifying processing based on video recognition processing) will be also referred to as "ACR (Automatic Content Recognition)".

Back to FIG. 1, additional information distribution device 30 will be described.

Additional information distribution device 30 is a server device connected to communication network 16, and is a website (advertisement distribution site) which holds and distributes advertisement information of various commercial goods. When receiving the content specifying processing result (analysis information 83 based on the content specifying processing result which video reception device 40 obtains from video recognition device 20) transmitted from video reception device 40 through communication network 16, additional information distribution device 30 transmits additional information related to this content specifying processing result (analysis information 83) to video reception device 40 through communication network 16. This additional information is, for example, advertisement information related to content specified by content specifying processing.

1-1-2. Configurations of Video Recognition Device and Video Reception Device FIG. 3 is a block diagram schematically illustrating an example of configurations of video recognition device 20 and video reception device 40 according to the first exemplary embodiment.

Figure 3:
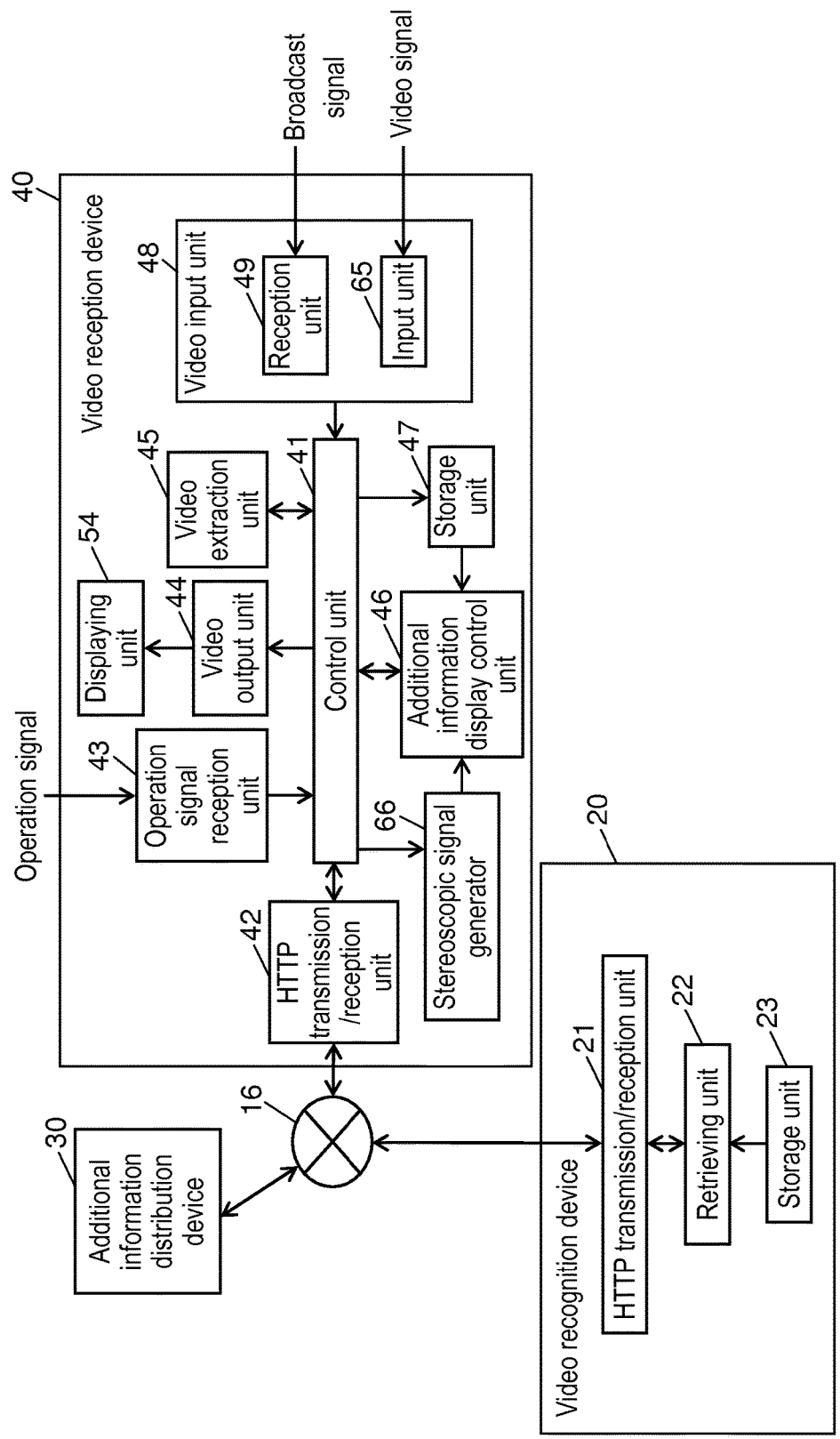
FIG. 3 is a block diagram schematically illustrating an example of configurations of the video recognition device and a video reception device according to the first exemplary embodiment.

In addition, FIG. 3 illustrates a main circuit block related to an operation described in the present exemplary embodiment, and does not illustrate functions and circuit blocks related to other operations for ease of understanding of the operations described in the present exemplary embodiment. Further, each circuit block illustrated in FIG. 3 may be configured as an independent circuit. Alternatively, each circuit block may be configured such that a program created to realize one or a plurality of circuit blocks illustrated in FIG. 3 is executed by a processor.

Video recognition device 20 is a server device which includes HTTP (Hypertext Transfer Protocol) transmission/reception unit 21, retrieving unit 22 and storage unit 23. Video recognition device 20 is configured to provide service of content specifying processing based on video recognition processing, to video reception device 40 through communication network 16.

HTTP transmission/reception unit 21 is an interface for communication, and is, for example, a communication adapter which is adapted to standards of the Ethernet (registered trademark). HTTP transmission/reception unit 21 is configured to transmit and receive data to and from video reception device 40 through communication network 16.

Storage unit 23 is a storage device which is configured by, for example, a HDD (Hard Disk Drive). Storage unit 23 is configured to associate a fingerprint of content broadcast from broadcast station 12, and analysis information of an analysis result of the content with the content to store. This fingerprint is, for example, a hash value of each image which configures a moving image.

Storage unit 23 associates fingerprints and analysis results (analysis information) of, for example, all channels (e.g. 300 channels) broadcast from broadcast station 12 to store per content (e.g. a main program or a CM) with a slight time delay (e.g. 10 seconds) from a start of a broadcast. This analysis result (analysis information) may include, for example, a program title, a CM title, a program outline, a CM outline, characters, a place related to a video, and a URL.

Retrieving unit 22 is configured to, when receiving a video recognition request accompanied by the fingerprint transmitted from video reception device 40 through HTTP transmission/reception unit 21, perform content specifying processing based on video recognition processing using the fingerprint, and return the result (analysis information) to video reception device 40 through HTTP transmission/reception unit 21.

More specifically, retrieving unit 22 receives the video recognition request accompanied by the fingerprint transmitted from video reception device 40, through communication network 16 and HTTP transmission/reception unit 21. Next, retrieving unit 22 cross-checks the received fingerprint and the fingerprints stored in the storage unit 23, and retrieves a fingerprint corresponding to the received fingerprint (video recognition processing). Further, retrieving unit 22 specifies the content corresponding to the fingerprint specified based on this retrieval result as content corresponding to the received fingerprint (content specifying processing). Thus, retrieving unit 22 specifies the content corresponding to the received fingerprint. Further, retrieving unit 22 reads the analysis result (analysis information) associated with the specified content from storage unit 23, and returns the read analysis result (analysis information) as the content specifying processing result to video reception device 40 through HTTP transmission/reception unit 21 and communication network 16.

Video reception device 40 includes control unit 41, HTTP transmission/reception unit 42, operation signal reception unit 43, video output unit 44, displaying unit 54, video extraction unit 45, additional information display control unit 46, storage unit 47, video input unit 48 and stereoscopic signal generator 66 which is a video signal generator. Video reception device 40 is configured to perform content specifying processing based on video recognition processing using video recognition device 20, obtain analysis information which is the content specifying processing result from video recognition device 20, obtain additional information (e.g. advertisement information) related to the analysis information from additional information distribution device 30, superimpose an image of the additional information (e.g. the advertisement information related to a video) on the video (content) of the received video signals and display the additional information on displaying unit 54.

HTTP transmission/reception unit 42 is an interface for communication, and is, for example, a communication adapter which is adapted to standards of the Ethernet (registered trademark). HTTP transmission/reception unit 42 is configured to transmit and receive data to and from video recognition device 20 through communication network 16.

Operation signal reception unit 43 is configured to receive an operation signal (an operation signal for video reception device 40) output from an operation unit (not illustrated) such as a remote control device (abbreviated as a "remote controller" below) which has received a user's operation. Operation signal reception unit 43 may be configured to receive a signal output from the remote controller including a gyro sensor based on a physical fluctuation of this remote controller.

Video input unit 48 is a reception circuit and a decoder, and includes reception unit 49 which is configured to receive broadcast signals broadcast from the broadcast station, and input unit 65 which is configured to receive an input of video signals output from the video transmission device (e.g. STB 14). Video signals received by video input unit 48 include content (e.g. a main program and CMs) switched as time passes.

Reception unit 49 is configured to receive broadcast signals transmitted from broadcast station 12, through an antenna (not illustrated) or the like.

Input unit 65 is an interface which is configured to receive an input of video signals output from the video transmission device installed outside. Input unit 65 is configured to adapt to, for example, the standards of the HDMI (registered trademark), and can receive video signals transmitted from the video transmission device through the HDMI (registered trademark). Further, input unit 65 can also receive an input of 3D video signals. This video transmission device is, for example, STB 14 yet may be a video recording/playback device or the like. Further, the input unit may be configured to receive video signals transmitted through a video cable and video signals transmitted by wireless communication.

Video output unit 44 has a function of controlling displaying unit 54, and is configured to control displaying unit

54 based on video signals input from video input unit 48 and display a video based on the video signals on displaying unit 54. When receiving an input of additional information from control unit 41, video output unit 44 superimposes an image based on the additional information, on the video which is being displayed on displaying unit 54.

Displaying unit 54 is a display which is configured to display a video based on video signals, and is, for example, a LCD (Liquid Crystal Display). However, the present exemplary embodiment is by no means limited to this configuration. Displaying unit 54 may be a PDP (Plasma Display Panel), an OLED (Organic Electro Luminescence Display) or the like.

Additional information display control unit 46 is configured to perform control of displaying additional information. More specifically, additional information display control unit 46 determines whether to display the additional information obtained from additional information distribution device 30, on displaying unit 54 based on the content specifying processing result obtained from video recognition device 20 (whether or not to superimpose the additional information on video signals) or whether to continuously display or hide the additional information which is being displayed on displaying unit 54, and outputs an instruction based on this determination to control unit 41. Furthermore, additional information display control unit 46 determines on which part of a video which is being displayed on displaying unit 54 an image (or a text) based on the obtained additional information is superimposed, and outputs an instruction based on this determination to control unit 41.

Video extraction unit 45 is configured to extract a partial video from the video signals input from video input unit 48. Video extraction unit 45 is configured to be also able to extract a partial video from 3D video signals input from video input unit 48. Video extraction unit 45 is configured to extract from video signals a partial video of a predetermined period of time which is part of the video signals at a predetermined cycle. When, for example, the predetermined cycle is 3 seconds and a predetermined period of time is 3 seconds, video extraction unit 45 repeats an operation of extracting a partial video of 3 seconds from the video signals every 3 second. That is, video extraction unit 45 repeats an operation of continuously extracting a partial video of 3 seconds from the video signals every 3 second without a pause. Further, when, for example, the predetermined cycle is 15 seconds and a predetermined period of time is 3 seconds, video extraction unit 45 repeats an operation of extracting a partial video of 3 seconds from the video signals every 15 second. That is, video extraction unit 45 repeats an operation of extracting a partial video of 3 seconds from the video signals at intervals of 12 seconds. In addition, a partial video to be extracted from video signals may not be extracted in units of seconds, and, for example, may be extracted in units of a predetermined number of frames at a video frame rate.

In the present exemplary embodiment, an example where video extraction unit 45 extracts a partial video from 3D video signals input from video input unit 48 will be described. That is, a partial video described below is a partial video of 3D video signals.

Stereoscopic signal generator 66 which is a video signal generator generates, from a partial video extracted by video extraction unit 45, 3D video signals of a plurality of methods to use for video recognition processing. Details of stereoscopic signal generator 66 will be described later.

Figure 4A:
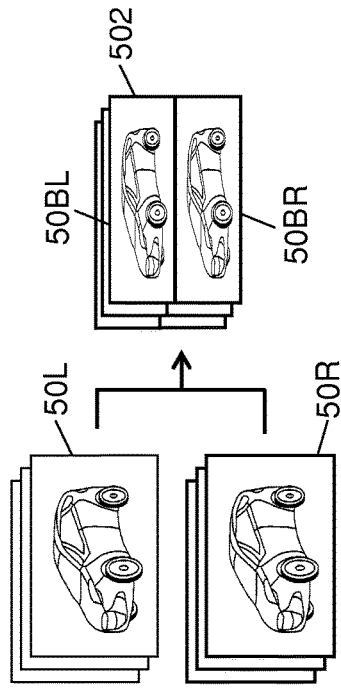
FIG. 4A is a schematic view schematically illustrating a side-by-side method which is one of transmission methods of 3D video signals.
Figure 4B:
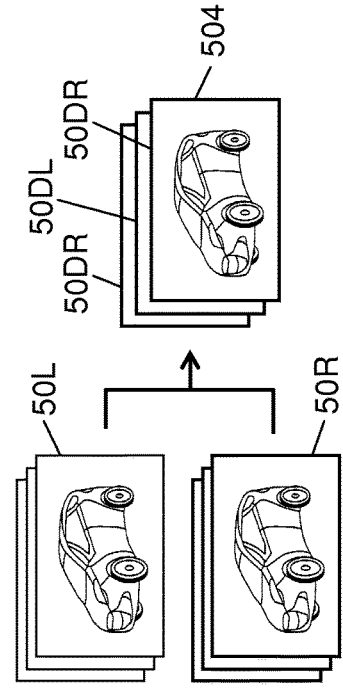
FIG. 4B is a schematic view schematically illustrating a line-by-line method which is one of the transmission methods of 3D video signals.
Figure 4C:
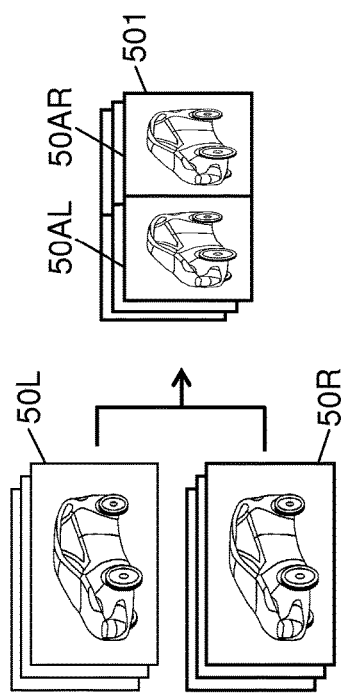
FIG. 4C is a schematic view schematically illustrating a top-and-bottom method which is one of the transmission methods of 3D video signals.
Figure 4D:
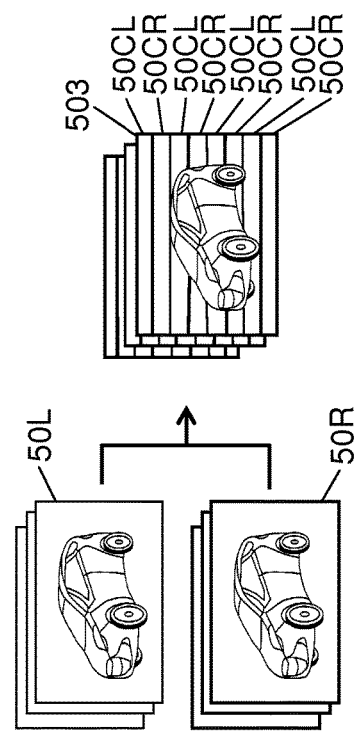
FIG. 4D is a schematic view schematically illustrating a frame sequential method which is one of the transmission methods of 3D video signals.

Hereinafter, an outline of a main transmission method of 3D video signals will be described with reference to FIGS. 4A to 4D. FIG. 4A is a schematic view schematically illustrating the side-by-side method which is one of the transmission methods of 3D video signals. FIG. 4B is a schematic view schematically illustrating the line-by-line method which is one of the transmission methods of 3D video signals. FIG. 4C is a schematic view schematically illustrating the top-and-bottom method which is one of the transmission methods of 3D video signals. FIG. 4D is a schematic view schematically illustrating the frame sequential method which is one of the transmission methods of 3D video signals.

Generally, 3D video signals are configured with video signals 50L for a left eye and video signals 50R for a right eye alternately provided. A number of frames produced in 1 second is twice as that of a normal video (a video which is not distinguished between left eye use and right eye use, and which are 2 Dimensional video images and will be referred to as a "2D video" below). This is because one frame of a 3D video is configured by one frame for the left eye and one frame for the right eye. Hence, when, for example, a 2D video signal includes 60 frames/second, a 3D video signal includes 120 frames/second. However, a specification of broadcast signals broadcast from broadcast station 12 is set based on 2D video signals. Therefore, when broadcasting 3D video content, broadcast station 12 needs to convert, for example, 3D video signals including 120 frames/second into video signals including 60 frames/second to broadcast the video signals.

Hence, according to the side-by-side method illustrated in FIG. 4A, video signals 50L for the left eye and video signals 50R for the right eye both are compressed to ½ in a horizontal direction to generate video signals 50AL for the left eye and video signals 50AR for the right eye. Further, video signals 50AL for the left eye compressed to ½ are arranged on a left side of one frame of video signals 501 for transmission, and video signals 50AR for the right eye compressed to ½ are arranged on a right side of one frame.

According to the top-and-bottom method illustrated in FIG. 4B, video signals 50L for the left eye and video signals 50R for the right eye both are compressed to ½ in a vertical direction to generate video signals 50BL for the left eye and video signals 50BR for the right eye. Further, video signals 50BL for the left eye compressed to ½ are arranged on an upper side of one frame of video signals 502 for transmission, and video signals 50BR for the right eye compressed to ½ are arranged on a lower side of one frame.

According to the line-by-line method illustrated in FIG. 4C, video signals 50L for the left eye and video signals 50R for the right eye are alternately arranged line by line on one frame of video signal 503 for transmission. That is, video signals 50CL generated by extracting odd-number-th (even-number-th in a next frame) lines from video signals 50L for the left eye, and video signals 50CR generated by extracting even-number-th (odd-number-th in the next frame) lines from video signals 50R for the right eye are alternately arranged line by line to generate video signal 503 of one frame.

Consequently, it is possible to transmit frames for the left eye including 60 frames/second and frames for the right eye including 60 frames/second using, for example, video signals 501, 502 and 503 including 60 frames/second.

According to the frame sequential method illustrated in FIG. 4D, video signals 50L for the left eye and video signals 50R for the right eye are alternately arranged frame by frame to generate video signals 504 for transmission. Consequently, it is possible to transmit video signals 50DL for the left eye including 30 frames/second and video signals 50DR for the right eye including 30 frames/second using, for example, video signals 504 including 60 frames/second.

In addition, video signals 501, 502 and 503 are schematically illustrated as videos which are displayed on the displaying unit in a state of transmitted video signals (e.g. 60 frames/second) similar to a 2D video instead of displaying 3D video signals as a 3D video for ease of understanding of a transmission method of 3D video signals. Hence, each 3D video signal is not displayed on displaying unit 54 in a state as illustrated.

According to each transmission method, received video signals are converted into a format suitable to view a 3D video and displayed on a display. Consequently, a viewer can view a 3D video displayed on displaying unit 54 as a stereoscopic video by, for example, using 3D video eyeglasses.

Back to FIG. 3, video reception device 40 will be described.

Storage unit 47 is a storage device which is configured by, for example, a non-volatile memory. Storage unit 47 stores, for example, program meta information such as an electronic program guide (EPG) received by video input unit 48, and the additional information and the display control information of the additional information obtained from additional information distribution device 30 through HTTP transmission/reception unit 42. The display control information of the additional information is information used to perform control of displaying the additional information, and includes, for example, information indicating a display period of the additional information.

Control unit 41 is configured to control each circuit block included in video reception device 40. Control unit 41 employs a configuration including, for example, a non-volatile memory such as a ROM which stores programs (e.g. application programs), a CPU which executes the programs, and a volatile memory such as a RAM which temporarily stores data, parameters and the like when the CPU executes a program.

Control unit 41 performs, for example, the following control. Control unit 41 controls video extraction unit 45 such that video extraction unit 45 extracts a partial video from video signals at predetermined cycles. Further, control unit 41 controls stereoscopic signal generator 66 such that stereoscopic signal generator 66 generates 3D video signals of a plurality of methods from a partial video every time video extraction unit 45 extracts the partial video. Furthermore, control unit 41 generates (calculates) a fingerprint from each of the partial video and the 3D video signals of a plurality of methods generated by stereoscopic signal generator 66. Still further, control unit 41 performs the content specifying processing (the content specifying processing based on the video recognition processing) based on the generated fingerprint using video recognition device 20. That is, control unit 41 controls each circuit block to transmit the fingerprint together with a video recognition request to video recognition device 20 through HTTP transmission/reception unit 42 and communication network 16, and request video recognition device 20 to perform content specifying processing (content specifying processing based on the video recognition processing) on this fingerprint. This fingerprint is, for example, a hash value of each image which configures a partial video, and is a hash value of each image which configures a 3D video generated by stereoscopic signal generator 66. Further, control unit 41 controls each circuit block to obtain the content specifying processing result (analysis information) of this fingerprint from video recognition device 20 through communication network 16 and HTTP transmission/reception unit 42, store the content specifying processing result in storage unit 47 and obtain additional information based on the content specifying processing result from additional information distribution device 30 through communication network 16 and HTTP transmission/reception unit 42. Besides, control unit 41 controls each circuit block to store the obtained additional information in storage unit 47, output the additional information to video output unit 44, superimpose the additional information on a video which is being displayed on displaying unit 54 and display the additional information. In this case, control unit 41 controls each circuit block to hide the additional information which is being displayed on displaying unit 54 when additional information display control unit 46 determines to "hide the additional information".

In addition, additional information display system 10 may be configured such that, when video reception device 40 requests video recognition device 20 to perform content specifying processing based on video recognition processing, video reception device 40 creates a signal (data) indicating a content specifying processing request, and transmits this signal as the video recognition request to video recognition device 20. However, a rule may be set between video reception device 40 and video recognition device 20 such that transmitting a fingerprint from video reception device 40 to video recognition device 20 is to request video recognition device 20 to perform content specifying processing based on video recognition processing instead of transmitting such a signal (data).

1-2. Operation

An operation of additional information display system 10 configured as described above will be described with reference to FIGS. 5 to 7.

As described above, when receiving an input of video signals output from the video transmission device such as STB 14, video reception device 40 performs content specifying processing on the video signals using video recognition device 20. Further, video reception device 40 obtains additional information 51 (e.g. advertisement information) related to the content specifying processing result from additional information distribution device 30, superimposes obtained additional information 51 on these video signals and displays the additional information on displaying unit 54. Furthermore, video reception device 40 displays or hides obtained additional information 51 (e.g. advertisement information) according to display control information of the additional information obtained together with this additional information 51.

The outline of this additional information display processing will be described below.

1-2-1. Operation of Additional Information Display Processing

Figure 5:
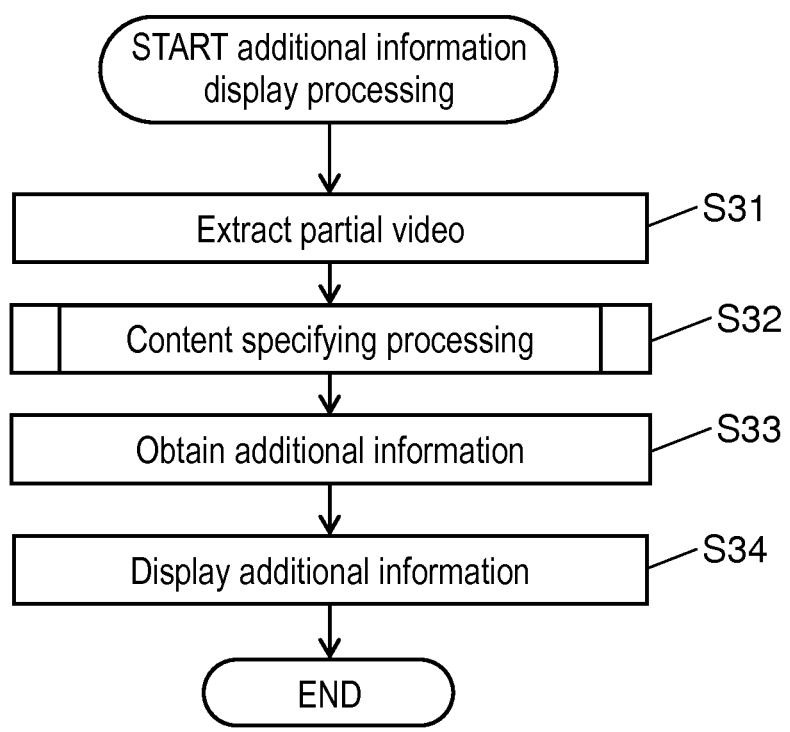
FIG. 5 is a flowchart schematically illustrating an operation of additional information display processing performed by the video reception device according to the first exemplary embodiment.

FIG. 5 is a flowchart schematically illustrating an operation of additional information display processing performed by video reception device 40 according to the first exemplary embodiment.

Video extraction unit 45 of video reception device 40 extracts a partial video from video signals output from STB 14 and input to input unit 65 (step S31). The video signals are video signals which are broadcast from broadcast station 12 and received by STB 14 and whose channel is selected by the user, and are 3D video signals according to the present exemplary embodiment.

Next, video reception device 40 performs the following content specifying processing (step S32).

Control unit 41 of video reception device 40 generates a fingerprint based on the partial video extracted by video extraction unit 45 and the 3D video signals generated from the partial video by stereoscopic signal generator 66. The generated fingerprint is transmitted to video recognition device 20 through HTTP transmission/reception unit 42 according to an instruction of control unit 41. Video recognition device 20 performs content specifying processing based on video recognition processing using this fingerprint, and transmits analysis information (a content specifying processing result) related to specified content, to video reception device 40 through communication network 16. In this case, when the content specifying processing fails, for example, video recognition device 20 may perform an operation of transmitting particular information such as "NG" or "0" as the analysis information to video reception device 40. Control unit 41 controls each circuit block to receive the analysis information (the content specifying processing result) transmitted from video recognition device 20, and store the analysis information in storage unit 47. Details of the content specifying processing will be described later.

Next, video reception device 40 obtains additional information based on the analysis information (step S33). Control unit 41 of video reception device 40 controls each circuit block to transmit the analysis information received from video recognition device 20, to additional information distribution device 30 through HTTP transmission/reception unit 42 and communication network 16. Additional information distribution device 30 transmits additional information related to the received analysis information to video reception device 40 through communication network 16. Control unit 41 controls each circuit block to receive the additional information transmitted from additional information distribution device 30, and store the additional information in storage unit 47.

In addition, each device may be configured such that a URL is included in analysis information obtained from video recognition device 20, and control unit 41 accesses additional information distribution device 30 by specifying this URL and obtains the information related to the URL as additional information related to the analysis information from additional information distribution device 30.

Control unit 41 controls each circuit block to transfer the received additional information to video output unit 44, superimpose this additional information on a video which is being displayed on displaying unit 54 according to the instruction from additional information display control unit 46, and display the additional information (step S34). Additional information display control unit 46 determines a display position, a display size, a display time and the like of the additional information based on display control information or the like of the additional information obtained together with the additional information, and outputs an instruction based on this determination to control unit 41.

When the above series of additional information display processing with respect to one partial video is finished, video reception device 40 extracts a next partial video and repeats the above additional information display processing.

Next, the content specifying processing in step S32 will be described.

1-2-2. Operation of Content Specifying Processing

Figure 6:
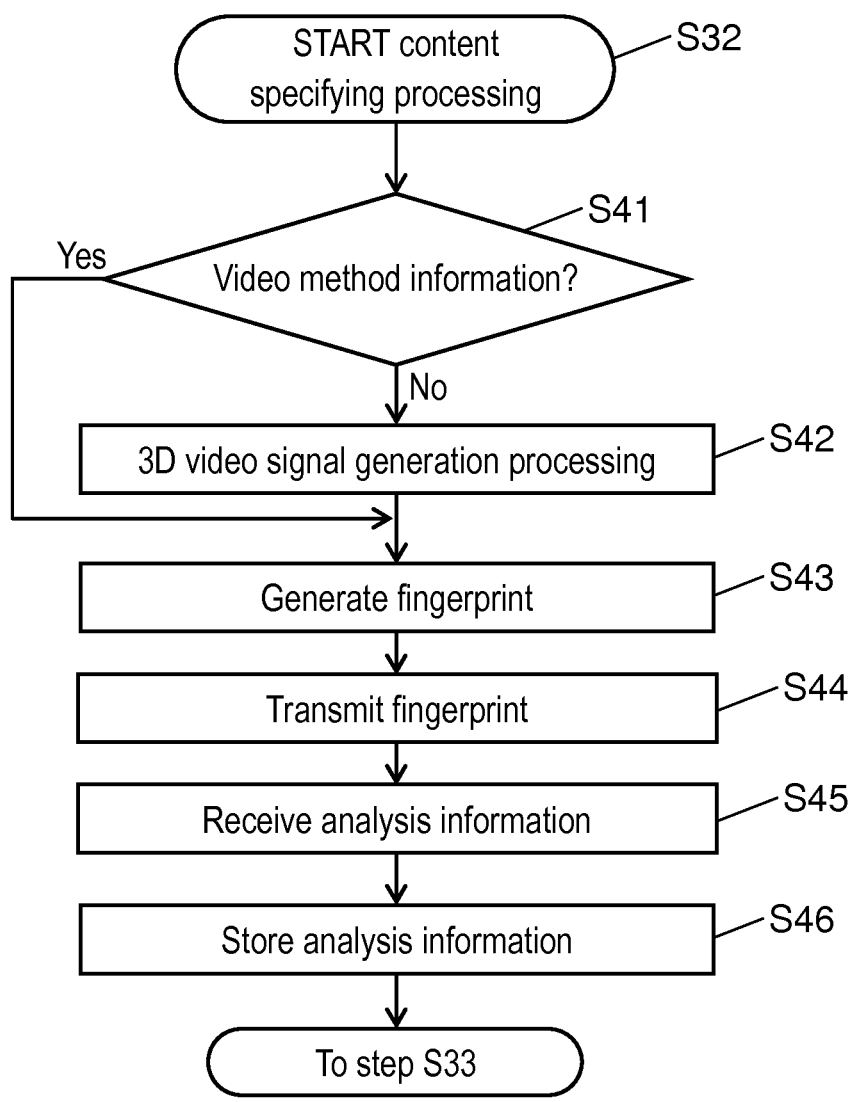
FIG. 6 is a flowchart schematically illustrating an operation of content specifying processing performed by the video reception device according to the first exemplary embodiment.

FIG. 6 is a flowchart schematically illustrating an operation of the content specifying processing performed by video reception device 40 according to the first exemplary embodiment.

Control unit 41 of video reception device 40 determines whether or not feature information (also referred to as "video method information" below) related to a transmission method of 3D video signals is input from STB 14 to video reception device 40 (step S41). This video method information includes, for example, feature information related to a method of 3D video signals which video recognition device 20 obtains from broadcast station 12. The video method information may include feature information related to a method of 3D video signals input from STB 14 to video reception device 40.

When it is determined in step S41 that the video method information has not been input (No), video reception device 40 performs 3D video signal generation processing (step S42). That is, control unit 41 instructs stereoscopic signal generator 66 to generate 3D video signals based on a plurality of 3D video methods. Stereoscopic signal generator 66 which has received this instruction generates, from a partial video extracted by video extraction unit 45, partial videos of a plurality of 3D video methods (partial videos of 3D video signals of different methods) different from that of the partial video (3D video signal generation processing). This is for the following reason.

In some cases, STB 14 converts 3D video signals broadcast from broadcast station 12 into 3D video signals of another method, and outputs the 3D video signals to video reception device 40. Hence, when there is no video method information, video reception device 40 cannot learn a method of 3D video signals which video recognition device 20 obtains from broadcast station 12.

When, for example, a method of 3D video signals input from STB 14 to video reception device 40, and a method of 3D video signals which video recognition device 20 obtains from broadcast station 12 differ, the video signals to be transmitted have different waveforms as described with reference to FIGS. 4A to 4D. Therefore, video reception device 40 and video recognition device 20 generate different fingerprints, and video recognition processing performed using these fingerprints is highly likely to fail.

Hence, in the present exemplary embodiment, when video reception device 40 cannot learn a method of 3D video signals which video recognition device 20 obtains from broadcast station 12 (video reception device 40 cannot obtain video method information), stereoscopic signal generator 66 of video reception device 40 operates based on an instruction from control unit 41, and generates, from a partial video extracted by video extraction unit 45, partial videos of a plurality of 3D video methods different from that of the partial video.

In this regard, video reception device 40 desirably sets a type of a 3D video method generated by stereoscopic signal generator 66 such that the method of 3D video signals which video recognition device 20 obtains from broadcast station 12 is highly likely to be included in a plurality of these 3D video methods.

An example of a partial video of 3D video signals generated by stereoscopic signal generator 66 will be described with reference to the drawings.

FIG. 7A is a schematic view schematically illustrating an example of 3D video signals 50 output from STB 14 which is an example of the video transmission device and input to video reception device 40. FIG. 7B is a schematic view schematically illustrating an example of partial video 410 extracted from 3D video signals 50 by video extraction unit 45 of video reception device 40 according to the first exemplary embodiment. FIG. 7C is a schematic view schematically illustrating an example of partial video 420 of 3D video signals generated from partial video 410 by stereoscopic signal generator 66 of video reception device 40 according to the first exemplary embodiment. FIG. 7D is a schematic view schematically illustrating an example of partial video 430 of 3D video signals generated from partial video 410 by stereoscopic signal generator 66 of video reception device 40 according to the first exemplary embodiment.

In addition, even though 3D video signals are transmitted as, for example, video signals including 60 frames/second, the 3D video signals are converted into video signals of 120 frames/second whose frames for the left eye including 60 frames/second and frames for the right eye including 60 frames/second are alternately displayed, and are displayed on displaying unit 54. However, FIGS. 7A to 7D are views schematically illustrating videos which are displayed as video signals (e.g. 60 frames/second) on the displaying unit in a state where the video signals are transmitted, extracted or generated similar to a 2D video instead of displaying 3D video signals as a 3D video for ease of understanding of a 3D video method. Hence, each 3D video signal is not displayed on displaying unit 54 in a state as illustrated.

As illustrated in, for example, FIG. 7A, when video reception device 40 receives an input of 3D video signals 50 of the side-by-side method from STB 14, video extraction unit 45 extracts partial video 410 of the side-by-side method from 3D video signals 50 as illustrated in FIG. 7B. Stereoscopic signal generator 66 generates partial video 420 of the top-and-bottom method which is illustrated as an example in FIG. 7C and partial video 430 of the line-by-line method which is illustrated as an example in FIG. 7D, from partial video 410 of the side-by-side method by applying video signal processing such as compression/stretching processing, line change processing or the like.

In addition, FIGS. 7A to 7D illustrate only examples of the present exemplary embodiment, and the present exemplary embodiment is by no means limited to these operations. Video reception device 40 may receive an input of 3D video signals of a method other than the side-by-side method, and stereoscopic signal generator 66 may generate a partial video of a 3D video method such as the frame sequential method or the like other than the above method.

Back to FIG. 6, the flowchart will be described.

Next, control unit 41 generates a fingerprint (step S43). Control unit 41 generates fingerprint 411 from partial video 410 of 3D video signals (e.g. side-by-side method) extracted by video extraction unit 45, generates fingerprint 421 from partial video 420 of 3D video signals (e.g. top-and-bottom method) generated by stereoscopic signal generator 66, and generates fingerprint 431 from partial video 430 of 3D video signals (e.g. line-by-line method) generated by stereoscopic signal generator 66. When stereoscopic signal generator 66 generates a partial video of another 3D video method which is not illustrated, control unit 41 generates a fingerprint from this partial video, too.

When it is determined in step S41 that the video method information has been input (Yes), control unit 41 generates a fingerprint based on the video method information (step S43).

When, for example, control unit 41 determines based on the video method information that the method (e.g. side-by-side method) of the 3D video signals which video recognition device 20 obtains from broadcast station 12, and the method (e.g. side-by-side method) of the 3D video signals input from STB 14 to video reception device 40 are the same, control unit 41 generates a fingerprint (e.g. fingerprint 411) from a partial video (e.g. partial video 410 of the side-by-side method) extracted by video extraction unit 45. In this regard, stereoscopic signal generator 66 may stop an operation of generating 3D video signals.

When control unit 41 determines based on the video method information that the method of 3D video signals which video recognition device 20 obtains from broadcast station 12, and the method of 3D video signals input from STB 14 to video reception device 40 are different, control unit 41 instructs stereoscopic signal generator 66 to generate 3D video signals of the same method as the method of 3D video signals which video recognition device 20 obtains from broadcast station 12. Further, stereoscopic signal generator 66 generates a partial video of the same method as the 3D video method instructed by control unit 41, from the partial video extracted by video extraction unit 45 based on this instruction, and outputs the partial video. Furthermore, control unit 41 generates a fingerprint from the partial video of the 3D video signals output from stereoscopic signal generator 66. In this case, control unit 41 may not generate a fingerprint from the partial video extracted by video extraction unit 45.

The fingerprint generated by control unit 41 is, for example, a hash value of each image which configures a partial video. However, in the present exemplary embodiment, content recognition information is by no means limited to a hash value and may be other information.

Next, control unit 41 controls each circuit block to transmit all fingerprints generated in step S43 to video recognition device 20 and request video recognition device 20 to perform content specifying processing (content specifying processing based on video recognition processing) (step S44).

In step S44, a single fingerprint is transmitted to video recognition device 20 when the determination is Yes in step S41, and a plurality of fingerprints (e.g. fingerprints 411, 421 and 431) is transmitted to video recognition device 20 when the determination is No in step S41.

Video recognition device 20 which has received the fingerprints cross-checks these fingerprints and fingerprints generated in advance based on content of 3D video signals distributed from broadcast station 12 and stored in storage unit 23, and performs the content specifying processing (the content specifying processing based on video recognition processing).

When, for example, broadcast station 12 transmits 3D video content of the side-by-side method to video recognition device 20, video recognition device 20 generates a fingerprint based on the 3D video of the side-by-side method, and stores the fingerprint in storage unit 23.

When video reception device 40 can learn the 3D video method based on video method information, video reception device 40 generates a fingerprint based on a 3D video of this 3D video method (e.g. side-by-side method), and transmits the fingerprint to video recognition device 20. Consequently, video recognition device 20 is highly likely to succeed in the content specifying processing.

When video reception device 40 cannot learn a 3D video method for a reason that video method information is not input, video reception device 40 generates partial videos of a plurality of different 3D video methods, and transmits a plurality of fingerprints generated from the respective partial videos to video recognition device 20 as described above. Video recognition device 20 performs the content specifying processing on each of a plurality of received fingerprints, and therefore is highly likely to succeed in the content specifying processing with respect to one of a plurality of these fingerprints (e.g. fingerprint 411 generated from the partial video of the side-by-side method).

Thus, in the present exemplary embodiment, even when video reception device 40 cannot learn a 3D video method of content transmitted from broadcast station 12 to video recognition device 20, video reception device 40 can precisely perform content specifying processing using video recognition device 20.

Video recognition device 20 specifies content by the content specifying processing performed in this way, reads analysis information corresponding to the content from storage unit 23 and returns the analysis information to video reception device 40. The processing of video recognition device 20 is finished here.

In addition, when failing content specifying processing with respect to all fingerprints, video recognition device 20 may return information (e.g. "0", "NG" or the like) indicating that the content specifying processing has failed, to video reception device 40.

Control unit 41 of video reception device 40 controls each circuit block to receive through HTTP transmission/reception unit 42 the analysis information (the content specifying processing result) transmitted from video recognition device 20 through communication network 16 as the result of step S44 (step S45). Next, control unit 41 controls each circuit block to store the received analysis information in storage unit 47 (step S46).

Subsequently, the flow moves to step S33 in FIG. 5.

Video reception device 40 performs the above series of content specifying processing (content specifying processing based on video recognition processing) for each of partial videos, obtains additional information related to the content, superimposes the additional information on 3D video signals and displays the additional information on displaying unit 54. Video reception device 40 repeats a series of these operations.

Next, the additional information displaying operation in step S34 will be described.

1-2-3. Operation of Additional Information Display

Control unit 41 of video reception device 40 controls each circuit block to transmit analysis information obtained from video recognition device 20 and stored in storage unit 47, to additional information distribution device 30 from HTTP transmission/reception unit 42 through communication network 16, and receives the additional information related to this analysis information from additional information distribution device 30.

This analysis information may include, for example, a URL related to commercial goods of a commercial goods image included in a partial video. In this case, control unit 41 transmits this URL to additional information distribution device 30, and additional information distribution device 30 returns additional information corresponding to this URL, to video reception device 40. This additional information may be, for example, advertisement information related to the commercial goods. Further, additional information distribution device 30 may return display control information of this additional information together with the additional information to video reception device 40.

Control unit 41 controls each circuit block to transfer the received additional information (e.g. advertisement information) to video output unit 44, superimpose this additional information on a video which is being displayed on displaying unit 54 according to the instruction from additional information display control unit 46, and display the additional information. This instruction output from additional information display control unit 46 may be based on determination made by additional information display control unit 46 as to a display position, a display size, a display time and the like of the additional information based on received display control information. Consequently, the received additional information (e.g. advertisement information) is displayed together with a 3D video on displaying unit 54 based on, for example, a display position, a display size and a display time instructed by additional information display control unit 46.

In addition, control unit 41 may detect a state of video signals, and perform control of displaying additional information based on this detection result. Control unit 41 may control each circuit block not to display additional information in a period in which a caption or an OSD is displayed and to display additional information in a period in which the caption or the OSD is not displayed when, for example, detecting that the caption or the OSD is superimposed on video signals.

1-3. Effect and Others

As described above, in the present exemplary embodiment, video reception device 40 is configured to transmit and receive data through communication network 16, and includes input unit 65, video extraction unit 45, stereoscopic signal generator 66 which is a video signal generator and control unit 41. Input unit 65 is configured to receive an input of 3D video signals output from the video transmission device (e.g. STB 14) installed outside. Video extraction unit 45 is configured to extract a partial video for video recognition processing, from the 3D video signals. Stereoscopic signal generator 66 is configured to generate, from the partial video, partial videos of a single or a plurality of 3D video methods different from the partial video. Control unit 41 is configured to perform control of generating a fingerprint from at least one of the partial video extracted by video extraction unit 45 and the partial videos of a single or a plurality of the 3D video methods generated by stereoscopic signal generator 66, transmitting the fingerprint to video recognition device 20 connected to communication network 16 so as to request video recognition device 20 to perform video recognition processing, obtaining a video recognition processing result from video recognition device 20, and obtaining additional information (e.g. advertisement information) based on the video recognition processing result from additional information distribution device 30 connected to communication network 16.

For example, in some cases, the video transmission device such as STB 14 converts 3D video signals broadcast from broadcast station 12 into 3D video signals of another method, and outputs the 3D video signals to video reception device 40. Hence, even though content is the same, a method of 3D video signals obtained by video reception device 40 and a method of 3D video signals obtained by video recognition device 20 differ from each other. Further, for a reason that video method information is not input, video reception device 40 cannot learn a method of 3D video signals which video recognition device 20 obtains from broadcast station 12 in some cases. In such a case, video reception device 40 and video recognition device 20 generate different fingerprints even though the content is the same. As a result, video recognition device 20 is likely to fail video recognition processing (content specifying processing based on video recognition processing).

However, when video reception device 40 according to the present exemplary embodiment cannot learn a 3D video method of content transmitted from broadcast station 12 to video recognition device 20, video reception device 40 generates partial videos of a plurality of 3D video methods different from that of a partial video based on the partial video extracted from the input 3D video signals, generates fingerprints from these partial videos and transmits the fingerprints to video recognition device 20. In this regard, video reception device 40 desirably sets a type of a 3D video method generated by stereoscopic signal generator 66 such that the method of 3D video signals transmitted from broadcast station 12 to video recognition device 20 is highly likely to be included in a plurality of these 3D video methods generated by stereoscopic signal generator 66.

Thus, even when video reception device 40 cannot learn a 3D video method of content transmitted from broadcast station 12 to video recognition device 20, video reception device 40 can precisely perform video recognition processing (content specifying processing based on video recognition processing) on a 3D video using video recognition device 20.

Further, video reception device 40 can obtain additional information based on the video recognition processing result from additional information distribution device 30, and superimpose the additional information on the video signals.

Furthermore, video reception device 40 may include displaying unit 54 which is configured to display a video obtained by superimposing additional information 51 on video signals.

Second Exemplary Embodiment

The second exemplary embodiment will be described below with reference to FIGS. 8 to 9E.

An example where stereoscopic signal generator 66 which is a video signal generator of video reception device 40 generates, from a partial video extracted by video extraction unit 45, partial videos based on 3D video signals of a plurality of methods has been described in the first exemplary embodiment. However, the present disclosure is by no means limited to this configuration.

For example, the video signal generator may be configured to generate a partial video of 2D video signals from a partial video extracted by video extraction unit 45. Hence, a video reception device which is configured to be able to generate a partial video of 2D video signals from a partial video extracted by video extraction unit 45, and perform content specifying processing will be described in the present exemplary embodiment.

2-1. Configuration

Figure 8:
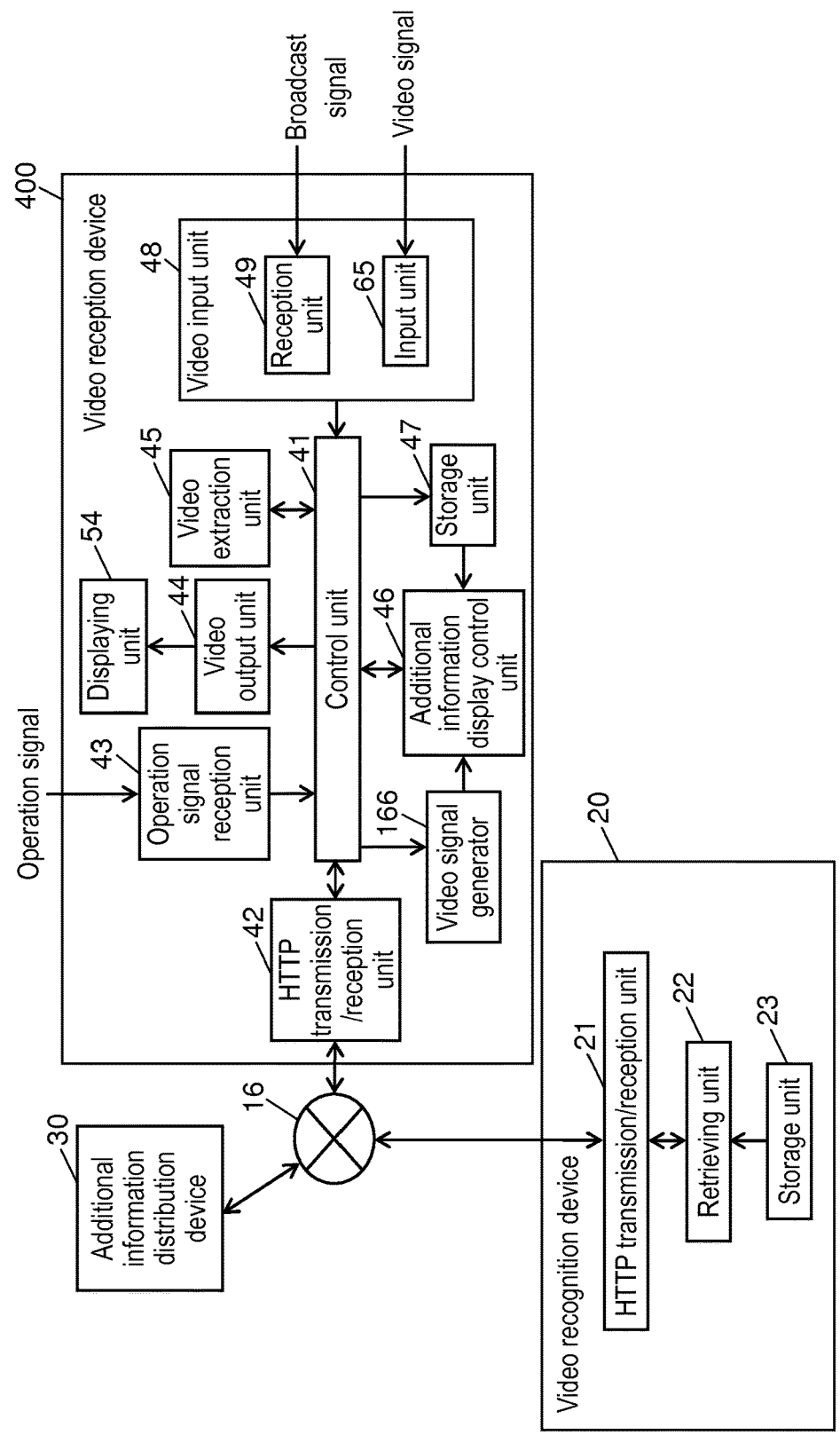
FIG. 8 is a block diagram schematically illustrating an example of configurations of a video recognition device and a video reception device according to a second exemplary embodiment.

FIG. 8 is a block diagram schematically illustrating an example of configurations of video recognition device 20 and video reception device 400 according to the second exemplary embodiment.

In addition, FIG. 8 illustrates a main circuit block related to an operation described in the present exemplary embodiment, and does not illustrate functions and circuit blocks related to other operations.

In addition, video reception device 400 according to the second exemplary embodiment employs the substantially same configuration as that of video reception device 40 illustrated in FIG. 3 in the first exemplary embodiment. Further, each circuit block performs the substantially same operations as those in the first exemplary embodiment.

Meanwhile, in the second exemplary embodiment, an operation of video signal generator 166 differs from that of stereoscopic signal generator 66 which is a video signal generator described in the first exemplary embodiment. Differences from the first exemplary embodiment will be described below, and the substantially same operations as those in the first exemplary embodiments will not be described.

2-2. Operation

Video extraction unit 45 extracts a partial video from 3D video signals output from a video transmission device such as STB 14 and input to video input unit 48 as described in the first exemplary embodiment.

In some cases, STB 14 converts 2D video signals broadcast from broadcast station 12 into 3D video signals, and outputs the 3D video signals to video reception device 400. Hence, when there is no video method information, video reception device 400 cannot learn whether video signals which video recognition device 20 obtains from broadcast station 12 are 2D video signals or 3D video signals.

In addition, this video method information includes, for example, feature information indicating whether the video signals which video recognition device 20 obtains from broadcast station 12 are 2D video signals or 3D video signals.

Hence, in the present exemplary embodiment, when video reception device 400 cannot learn a method of video signals which video recognition device 20 obtains from broadcast station 12 (video reception device 400 cannot obtain video method information), video signal generator 166 of video reception device 400 performs an operation of generating 3D video signals of a plurality of methods and, in addition, 2D video signals, too, from the partial video.

Figure 9D:
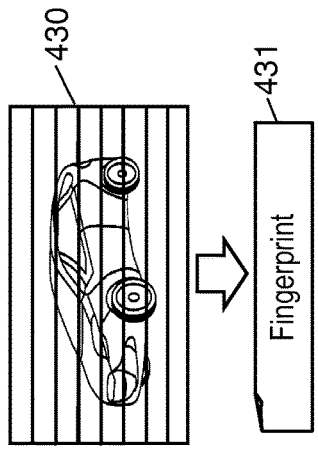
FIG. 9D is a schematic view schematically illustrating an example of a partial video of 3D video signals generated from the partial video by the video signal generator of the video reception device according to the second exemplary embodiment.
Figure 9E:
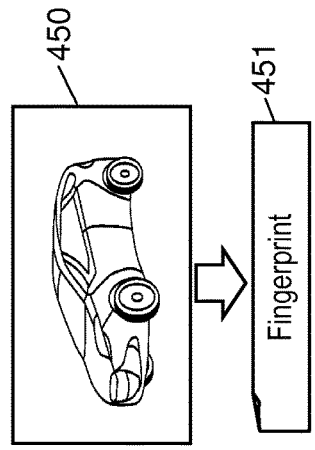
FIG. 9E is a schematic view schematically illustrating an example of a partial video of 2D video signals generated from the partial video by the video signal generator of the video reception device according to the second exemplary embodiment.
Figure 9A:
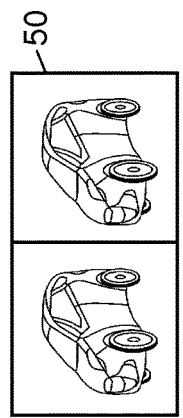
FIG. 9A is a schematic view schematically illustrating an example of 3D video signals output from a STB which is an example of a video transmission device and input to the video reception device.
Figure 9B:
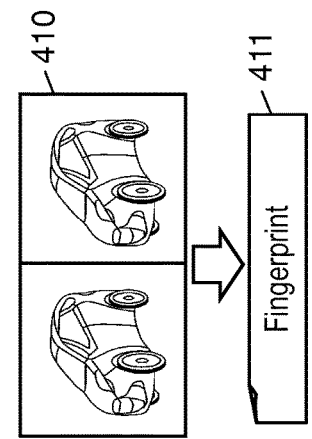
FIG. 9B is a schematic view schematically illustrating an example of a partial video extracted from 3D video signals by a video extraction unit of the video reception device according to the second exemplary embodiment.
Figure 9C:
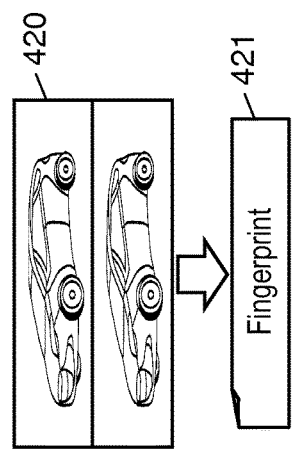
FIG. 9C is a schematic view schematically illustrating an example of a partial video of 3D video signals generated from the partial video by a video signal generator of the video reception device according to the second exemplary embodiment.

FIG. 9A is a schematic view schematically illustrating an example of 3D video signals 50 output from STB 14 which is an example of a video transmission device and input to video reception device 400. FIG. 9B is a schematic view schematically illustrating an example of partial video 410 extracted from 3D video signals 50 by video extraction unit 45 of video reception device 400 according to the second exemplary embodiment. FIG. 9C is a schematic view schematically illustrating an example of partial video 420 of 3D video signals generated from partial video 410 by video signal generator 166 of video reception device 400 according to the second exemplary embodiment. FIG. 9D is a schematic view schematically illustrating an example of partial video 430 of 3D video signals generated from partial video 410 by video signal generator 166 of video reception device 400 according to the second exemplary embodiment. FIG. 9E is a schematic view schematically illustrating an example of partial video 450 of 2D video signals generated from partial video 410 by video signal generator 166 of video reception device 400 according to the second exemplary embodiment.

In addition, FIGS. 9A to 9D are views schematically illustrating 3D video signals for ease of understanding of 3D video methods similar to FIGS. 7A to 7D. Each 3D video signal is not displayed on displaying unit 54 in a state as illustrated.

As illustrated in, for example, FIG. 9A, when video reception device 400 receives an input of 3D video signals 50 of the side-by-side method from STB 14, video extraction unit 45 extracts partial video 410 of the side-by-side method from 3D video signals 50 as illustrated in FIG. 9B. Similar to stereoscopic signal generator 66 according to the first exemplary embodiment, when there is no video method information, video signal generator 166 generates partial video 420 of the top-and-bottom method which is illustrated as an example in FIG. 9C and partial video 430 of the line-by-line method which is illustrated as an example in FIG. 9D, from partial video 410 of the side-by-side method by applying video signal processing such as compression/stretching processing, line change processing or the like based on an instruction of control unit 41. Further, video signal generator 166 generates partial video 450 of 2D video signals from partial video 410 of the side-by-side method.

In addition, FIGS. 9A to 9E illustrate only operation examples, and the present exemplary embodiment is by no means limited to these operations. Video reception device 400 may receive an input of 3D video signals of a method other than the side-by-side method, and video signal generator 166 may generate a partial video of a 3D video method such as the frame sequential method or the like other than the above method.

Further, control unit 41 generates fingerprint 411 from partial video 410 of 3D video signals (e.g. side-by-side method) extracted by video extraction unit 45, generates fingerprint 421 from partial video 420 of 3D video signals (e.g. top-and-bottom method) generated by video signal generator 166, and generates fingerprint 431 from partial video 430 of 3D video signals (e.g. line-by-line method) generated by video signal generator 166. Furthermore, control unit 41 generates fingerprint 451 from partial video 450 of the 2D video signals generated by video signal generator 166. When video signal generator 166 generates a partial video of another 3D video method which is not illustrated, control unit 41 generates a fingerprint from this partial video, too.

The fingerprint generated by control unit 41 is, for example, a hash value of each image which configures a partial video. However, in the present exemplary embodiment, content recognition information is by no means limited to a hash value and may be other information.

Further, control unit 41 controls each circuit block to transmit all generated fingerprints (e.g. fingerprints 411, 421, 431 and 451) to video recognition device 20 and request video recognition device 20 to perform content specifying processing (content specifying processing based on video recognition processing).

Subsequent operations of video recognition device 20 and video reception device 400 are the substantially same as the operations of video recognition device 20 and video reception device 40 described in the first exemplary embodiment, and therefore will not be described. Further, an operation of video reception device 400 when video reception device 400 can learn a video signal method which video recognition device 20 obtains from broadcast station 12 based on video method information is also the substantially same as the operation of video reception device 40 described in the first exemplary embodiment, and therefore will not be described. In this case, when, for example, video reception device 400 can learn based on video method information that video signals which video recognition device 20 obtains from broadcast station 12 are 2D video signals, video signal generator 166 of video reception device 400 may generate only a partial video of 2D video signals from a partial video of 3D video signals extracted by video extraction unit 45, and control unit 41 may perform an operation of generating a fingerprint only from the partial video of 2D video signals.

2-3. Effect and Others

As described above, in the present exemplary embodiment, video signal generator 166 included in video reception device 400 is configured to generate a partial video of 2D video signals, too, from a partial video of 3D video signals extracted by video extraction unit 45 in addition to a function of stereoscopic signal generator 66 described in the first exemplary embodiment. Control unit 41 is configured to generate a fingerprint from at least one of the partial video extracted by video extraction unit 45, the partial video of the 2D video signals generated by video signal generator 166 and partial videos of a single or a plurality of 3D video methods.

For example, in some cases, the video transmission device such as STB 14 converts 2D video signals broadcast from broadcast station 12 into 3D video signals, and outputs the 3D video signals to video reception device 400. Hence, even though content is the same, video reception device 400 receives an input of 3D video signals while video recognition device 20 obtains 2D video signals. In such a case, video reception device 40 and video recognition device 20 generate different fingerprints even though the content is the same. As a result, video recognition device 20 is likely to fail video recognition processing (content specifying processing based on video recognition processing).

However, when video reception device 400 according to the present exemplary embodiment cannot learn a video method of content transmitted from broadcast station 12 to video recognition device 20, video reception device 400 generates partial videos of a plurality of 3D video methods different from that of a partial video based on the partial video extracted from the input 3D video signals, generates a partial video of 2D video signals, too, generates fingerprints from these partial videos and transmits the fingerprints to video recognition device 20. Thus, even when video reception device 400 cannot learn a video method of content transmitted from broadcast station 12 to video recognition device 20, video reception device 400 can precisely perform video recognition processing (content specifying processing based on video recognition processing) using video recognition device 20.

Third Exemplary Embodiment

The third exemplary embodiment will be described below with reference to FIGS. 10 to 12.

Examples where control unit 41 of video reception device 40 (or video reception device 400) generates fingerprints from a partial video extracted by video extraction unit 45 and a plurality of partial videos generated by stereoscopic signal generator 66 (or video signal generator 166) have been described in the first and second exemplary embodiments. For example, an operation where control unit 41 generates fingerprints 411, 421 and 431 from partial videos 410, 420 and 430 has been described in the first exemplary embodiment with reference to FIGS. 7A to 7D. However, the present disclosure is by no means limited to this configuration.

For example, the control unit may be configured to generate local fingerprints (referred to as "local recognition information" below) from a partial video extracted by video extraction unit 45 and a plurality of partial videos generated by stereoscopic signal generator 66 (or video signal generator 166), and perform content specifying processing using this local recognition information. Hence, a video reception device which is configured to be able to generate local recognition information, and perform content specifying processing will be described in the present exemplary embodiment.

3-1. Configuration

The present exemplary embodiment will be described based on video reception device 40 according to the first exemplary embodiment. However, the present exemplary embodiment may be based on video reception device 400 according to the second exemplary embodiment. That is, in the following description, the first exemplary embodiment may be read as the second exemplary embodiment, video reception device 40 may be read as video reception device 400 and stereoscopic signal generator 66 may be read as video signal generator 166.

Figure 10:
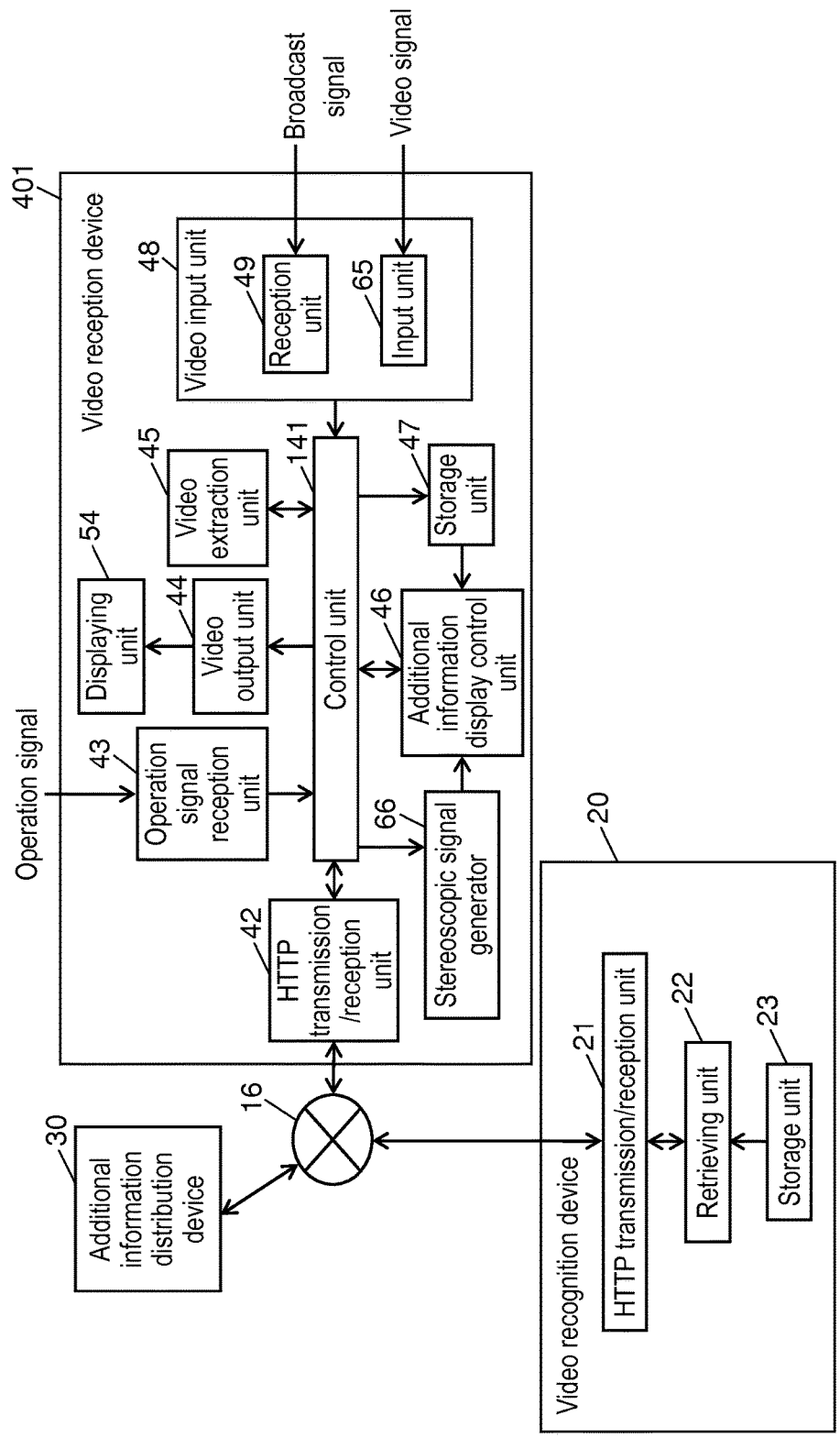
FIG. 10 is a block diagram schematically illustrating an example of configurations of a video recognition device and a video reception device according to a third exemplary embodiment.

FIG. 10 is a block diagram schematically illustrating an example of configurations of video recognition device 20 and video reception device 401 according to the third exemplary embodiment.

In addition, FIG. 10 illustrates a main circuit block related to an operation described in the present exemplary embodiment, and does not illustrate functions and circuit blocks related to other operations.

In addition, video reception device 401 according to the third exemplary embodiment employs the substantially same configuration as that of video reception device 40 illustrated in FIG. 3 in the first exemplary embodiment. Further, each circuit block performs the substantially same operations as those in the first exemplary embodiment. Meanwhile, in the third exemplary embodiment, an operation of control unit 141 differs from that of control unit 41 described in the first exemplary embodiment. Differences from the first exemplary embodiment will be described below, and the substantially same operations as those in the first exemplary embodiments will not be described.

3-2. Operation

Figure 11:
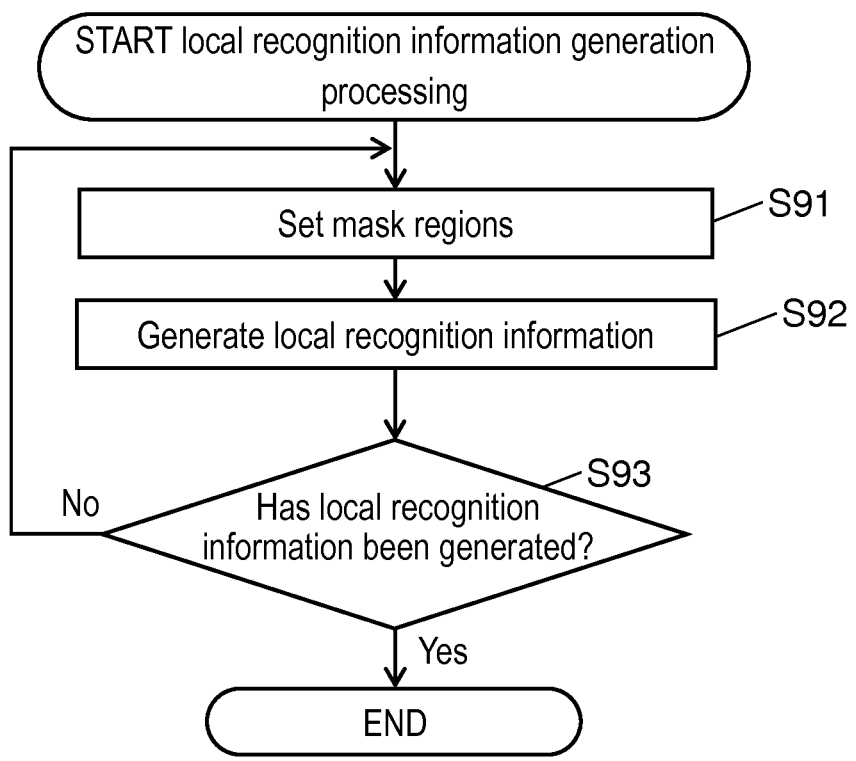
FIG. 11 is a flowchart schematically illustrating an operation of local recognition information generation processing performed by the video reception device according to the third exemplary embodiment.

FIG. 11 is a flowchart schematically illustrating an operation of local recognition information generation processing performed by video reception device 401 according to the third exemplary embodiment.

In addition, the flowchart illustrated in FIG. 11 is an operation corresponding to the fingerprint generation processing (step S43) of the flowchart of the content specifying processing illustrated in FIG. 6 in the first exemplary embodiment. An operation of video reception device 401 according to the third exemplary embodiment is the substantially same as the operation of video reception device 40 according to the first exemplary embodiment except that the fingerprint generation processing in step S43 in the first exemplary embodiment is replaced with local recognition information generation processing illustrated in the flowchart in FIG. 11.

Hence, when video reception device 401 cannot learn a method of video signals which video recognition device 20 obtains from broadcast station 12 (video reception device 401 cannot obtain video method information), control unit 141 of video reception device 401 sets mask regions to a partial video of 3D video signals extracted by video extraction unit 45 and a plurality of partial videos generated by stereoscopic signal generator 66 (step S91).

Next, control unit 141 calculates local recognition information of each of the mask regions (the mask regions set to each partial video) set in step S91 (step S92).

This fingerprint generated by control unit 141 is, for example, a hash value of the mask region of each image which configures a partial video. However, in the present exemplary embodiment, the local recognition information is by no means limited to a hash value. The local recognition information may be information (data) which can be used for video recognition processing.

Further, control unit 141 determines whether or not the local recognition information is generated for all partial videos (step S93), and repeats steps S91 and S92 until the local recognition information is generated for all partial videos.

Control unit 141 controls each circuit block to, when it is determined in step S93 that the local recognition information has been generated for all of the partial video extracted by video extraction unit 45 and a plurality of partial videos generated by stereoscopic signal generator 66 (Yes), finish the local recognition information generation processing, moves, for example, the flow to step S44 illustrated in FIG. 6 in the first exemplary embodiment, and transmit the local recognition information to video recognition device 20.

Subsequent operations of video recognition device 20 and video reception device 401 are the substantially same as the operations of video recognition device 20 and video reception device 40 described in the first exemplary embodiment, and therefore will not be described. Further, an operation of video reception device 401 when video reception device 401 can learn a video signal method which video recognition device 20 obtains from broadcast station 12 based on 3D video method information is also the substantially same as the operation of video reception device 40 described in the first exemplary embodiment, and therefore will not be described.

Next, an example of the mask region setting operation and the local recognition information generating operation described in steps S91 and S92 will be described with reference to the drawings.

Figure 12:
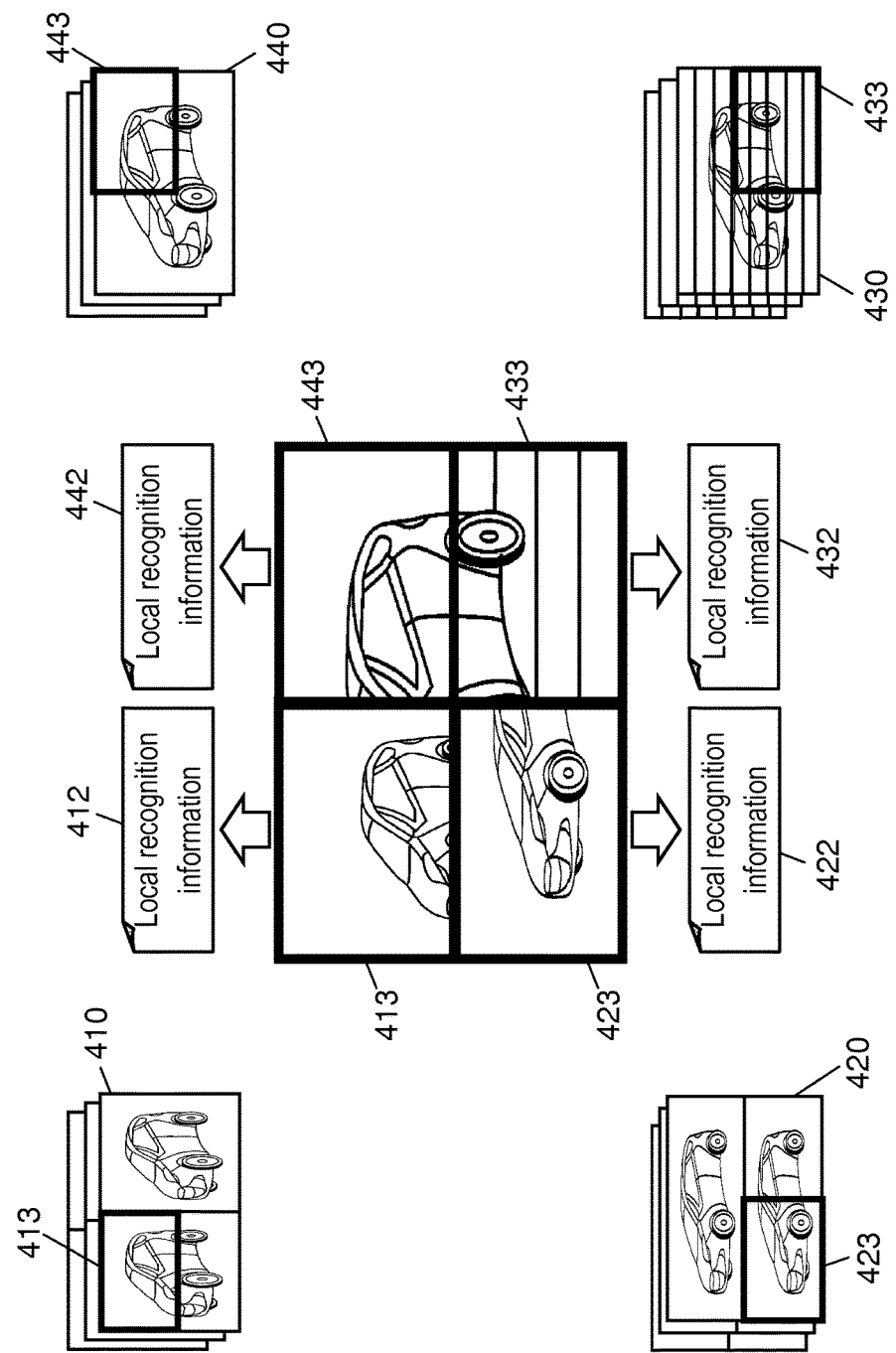
FIG. 12 is a schematic view schematically illustrating an example of a mask region set to each partial video by a control unit of the video reception device according to the third exemplary embodiment.

FIG. 12 is a schematic view schematically illustrating an example of a mask region set to each partial video by control unit 141 of video reception device 401 according to the third exemplary embodiment.

In addition, the view illustrated in FIG. 12 is a view schematically illustrating 3D video signals for ease of understanding of a 3D video method similar to FIGS. 7A to 7D. Further, one frame used for the following description is one frame (e.g. a video signal of 1/60 seconds) of a video signal (e.g. 60 frames/second) upon transmission. This one frame is one frame (e.g. a video signal of 1/60 seconds) of a video signal (e.g. 60 frames/second) output from stereoscopic signal generator 66, and is not one frame of a video signal (e.g. 120 frames/second) which are displayed as a 3D video on displaying unit 54.

In addition, hereinafter, an example where video extraction unit 45 extracts partial video 410 from 3D video signals of the side-by-side method, and stereoscopic signal generator 66 generates partial video 420 of 3D video signals of the top-and-bottom method, partial video 430 of 3D video signals of the line-by-line method and partial video 440 of 3D video signals of the frame sequential method from partial video 410 of the side-by-side method will be described.

Control unit 141 of video reception device 401 first sets mask region 413 to a region of partial video 410 of the side-by-side method corresponding to about ¼ at an upper left of a screen of a video signal of one frame (one frame of a video signal which is transmitted from STB 14 and includes, for example, 60 frames/second). Further, control unit 141 generates a fingerprint in a range of mask region 413 of partial video 410. This fingerprint is local recognition information 412.

In this case, an arithmetic operation amount which control unit 141 requires to generate local recognition information 412 is reduced compared to an arithmetic operation amount required to generate a fingerprint of a region corresponding to one screen.

Next, control unit 141 sets mask region 423 to a region of partial video 420 of the top-and-bottom method corresponding to about ¼ at a lower left of the screen of a video signal of one frame (one frame of a video signal which is generated by stereoscopic signal generator 66 and includes, for example, 60 frames/second). Further, control unit 141 generates local recognition information 422 in a range of mask region 423 of partial video 420.

In this case, an arithmetic operation amount which control unit 141 requires to generate local recognition information 422 is reduced compared to an arithmetic operation amount required to generate a fingerprint of a region corresponding to one screen similar to the above.

Next, control unit 141 sets mask region 433 to a region of partial video 430 of the line-by-line method corresponding to about ¼ at a lower right of the screen of a video signal of one frame (one frame of a video signal which is generated by stereoscopic signal generator 66 and includes, for example, 60 frames/second). Further, control unit 141 generates local recognition information 432 in a range of mask region 433 of partial video 430.

In this case, an arithmetic operation amount which control unit 141 requires to generate local recognition information 432 is reduced compared to an arithmetic operation amount required to generate a fingerprint of a region corresponding to one screen similar to the above.

Next, control unit 141 sets mask region 443 to a region of partial video 440 of the frame sequential method corresponding to about ¼ at an upper right of the screen of a video signal of one frame (one frame of a video signal which is generated by stereoscopic signal generator 66 and includes, for example, 60 frames/second). Further, control unit 141 generates local recognition information 442 in a range of mask region 443 of partial video 440.

In this case, an arithmetic operation amount which control unit 141 requires to generate local recognition information 442 is reduced compared to an arithmetic operation amount required to generate a fingerprint of a region corresponding to one screen similar to the above.

Further, all pieces of the generated local recognition information (e.g. the pieces of local recognition information 412, 422, 432 and 442) are transmitted to video recognition device 20, and video recognition device 20 performs content specifying processing (content specifying processing based on video recognition processing) based on these pieces of local recognition information.

Thus, control unit 141 according to the present exemplary embodiment sets mask regions to different regions of each partial video such as ranges of each ¼ screen at the upper left, the lower left, the lower right and the upper right of one screen, and generates a fingerprint (local recognition information) in these mask regions. Consequently, an arithmetic operation amount which control unit 141 requires to generate local recognition information of each partial video is reduced compared to an arithmetic operation amount required to generate a fingerprint of a region of one screen. In this regard, the third exemplary embodiment differs from the first and second exemplary embodiments where a fingerprint is generated in a range of substantially one screen of each partial video.

In addition, FIG. 12 illustrates only an example of the present exemplary embodiment, and the present exemplary embodiment is by no means limited to these operations. Video reception device 401 may receive an input of 3D video signals of a method other than the side-by-side method, and stereoscopic signal generator 66 may generate a partial video of a 3D video method other than the above method. Further, a partial video of 2D video signals may be generated as described in the second exemplary embodiment. Furthermore, mask regions are by no means limited to the regions illustrated in FIG. 12, and may be adequately set according to the number of partial videos generated by stereoscopic signal generator 66 (or video signal device 166). Alternatively, control unit 141 may be configured to detect a caption or an OSD, and adequately set mask regions according to a detection result. Alternatively, a mask region may change per content. Alternatively, a mask region may be configured to be arbitrarily set by a user.

In addition, a configuration where video reception device 401 transmits information indicating mask regions set by video reception device 401 together with local recognition information or in advance to video recognition device 20, and video recognition device 20 generates local recognition information based on the mask regions may be employed.

In addition, stereoscopic signal generator 66 may be configured to generate a partial video of one 3D video method different from a 3D video method of a partial video extracted by video extraction unit 45.

3-3. Effect and Others

As described above, in the present exemplary embodiment, control unit 141 of video reception device 401 sets different mask regions to a partial video of 3D video signals extracted by video extraction unit 45, and partial videos of a single or a plurality of 3D video methods generated by a stereoscopic signal generator 66 which is the video signal generator, and generates local recognition information of each mask region.

Consequently, it is possible to reduce the arithmetic operation amount which control unit 141 requires to generate the local recognition information compared to a configuration of generating a fingerprint from a video signal corresponding to one screen.

An additional information display system according to the present exemplary embodiment is configured to generate fingerprints of the partial video extracted by video extraction unit 45 and a plurality of partial videos generated from this partial video, transmit a plurality of these fingerprints to video recognition device 20 and perform one content specifying processing (content specifying processing based on video recognition processing). That is, the video reception device according to the present exemplary embodiment needs to generate a fingerprint of each of a plurality of partial videos used for the content specifying processing every time a partial video is extracted from video signals. Consequently, reducing a time required to generate one fingerprint (local recognition information) is effective to reduce a time required for one content specifying processing (the content specifying processing based on the video recognition processing).

Other Exemplary Embodiment

As described above, the first to third exemplary embodiments have been described as an exemplary technique disclosed in the present application. However, the technique according to the present disclosure is not limited to this, and is also applicable to exemplary embodiments which are optionally changed, replaced, added and omitted. Further, each component described in the above first to third exemplary embodiments can also be combined to provide new exemplary embodiments.

Another exemplary embodiment will be described below.

Configurations where video reception devices 40, 400 and 401 include displaying units 54 have been described in the first to third exemplary embodiments. However, the video reception device according to the present exemplary embodiment is by no means limited to this configuration. The video reception device may not include the displaying unit.

Figure 13:
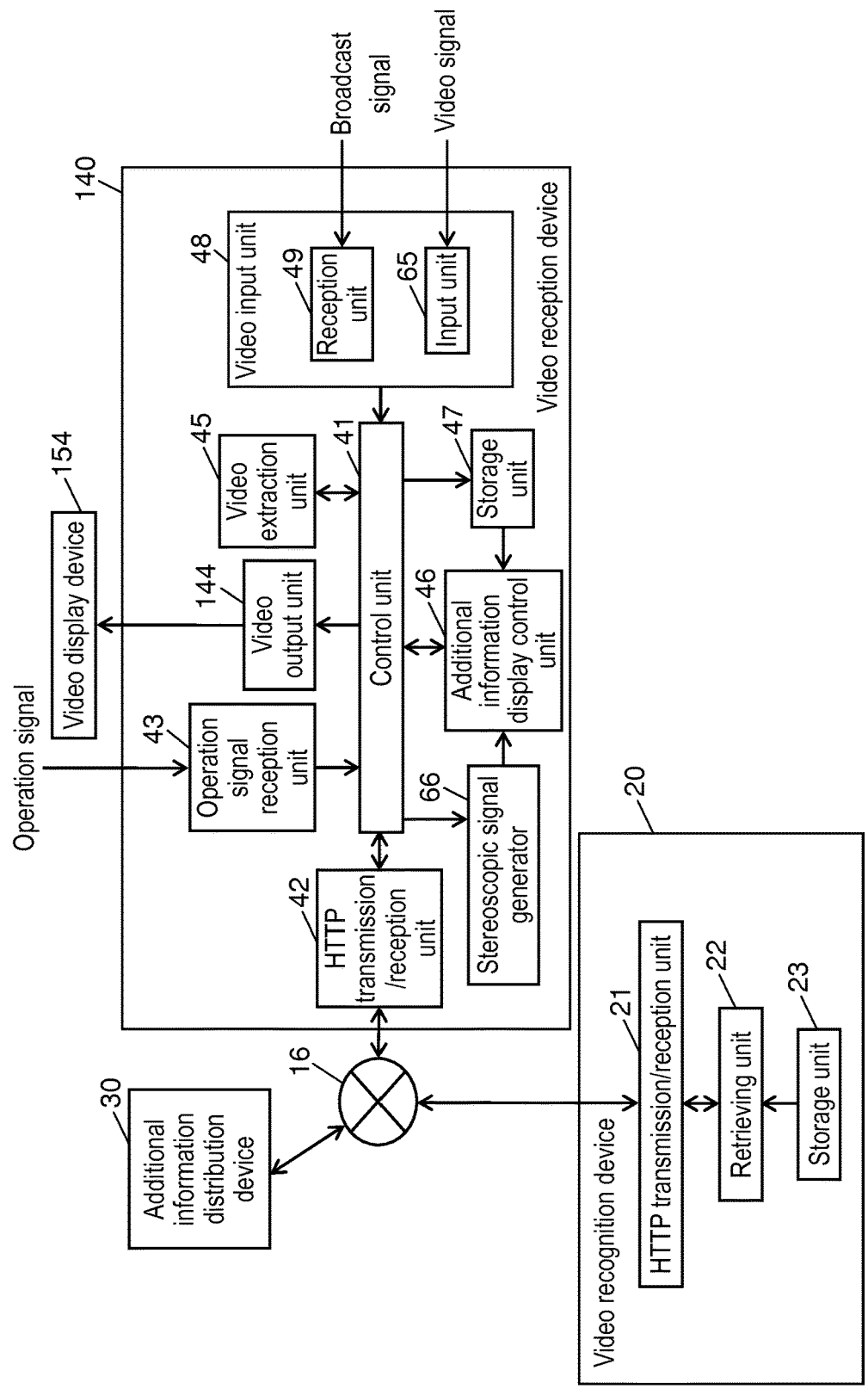
FIG. 13 is a block diagram schematically illustrating an example of configurations of a video recognition device and a video reception device according to another exemplary embodiment.

FIG. 13 is a block diagram schematically illustrating an example of a configuration of video reception device 140 according to another exemplary embodiment. Video reception device 140 illustrated in FIG. 13 differs from video reception device 40 illustrated in FIG. 3 in the first exemplary embodiment in the following points. Video reception device 140 does not include displaying unit 54, and video output unit 144 is configured to output video signals to video display device 154 installed outside through wires or by radio. Similar to video output unit 44 described in the first exemplary embodiment, video output unit 144 superimposes additional information on video signals based on an instruction from control unit 41.

An example of video reception device 140 of this type is, for example, a recording device which has, for example, a recording function, a broadcast signal receiving function, a video signal input function and a video signal output function, and which is configured to transmit video signals to video display device 154 installed outside. Such a recording device is, for example, a hard disk recorder, a DVD recorder, a BD recorder or the like.

In addition, in FIG. 13, components which perform substantially same operations as components which make up video reception device 40 illustrated in FIG. 3 will be assigned the same reference numerals, and will not be described. Further, FIG. 13 illustrates a main circuit block related to an operation described in the present exemplary embodiment, and does not illustrate functions and circuit blocks (e.g. a recording function) related to other operations.

Video reception device 140 employing such a configuration can provide the same effects as those of video reception device 40 described in the first exemplary embodiment.

In addition, FIG. 13 illustrates video reception device 140 which is based on video reception device 40 according to the first exemplary embodiment. However, the configuration (a configuration where video display device 154 is provided outside) illustrated in FIG. 13 is also applicable to video reception device 400 according to the second exemplary embodiment or video reception device 401 according to the third exemplary embodiment.

In addition, the video reception device according to the present exemplary embodiment may be configured to, when content related information is not output from the video transmission device, instruct the video transmission device to output a signal for requesting an output of content related information.

In addition, each component described in the present exemplary embodiment may be configured as an independent circuit. Alternatively, each component may be configured such that a program created to realize one or a plurality of the operations is executed by a processor. Further, this program may be obtained by being downloaded from a server or the like or may be obtained through a predetermined recording medium (e.g. an optical disk such as a CD-ROM, a magnetic disk or a semiconductor memory).

Furthermore, each operation of the server described in the present exemplary embodiment may be collectively processed by a single server or may be distributed to and processed by a plurality of servers.

In addition, specific numerical values described in the first to third exemplary embodiments are only exemplary numerical values in the exemplary embodiments, and the present disclosure is by no means limited to these numerical values. Each numerical value is desirably set to an optimal value according to a specification of a video reception device or the like.

INDUSTRIAL APPLICABILITY

The present disclosure is applicable to a video reception device which can obtain additional information related to video signals input from a video transmission device installed outside, and superimpose the obtained additional information on the video signals. More specifically, the present disclosure is applicable to a television receiver, a hard disk recorder, a DVD recorder, a BD recorder and the like.

REFERENCE MARKS IN THE DRAWINGS

10 additional information display system
12 broadcast station
14 STB
16 communication network
20 video recognition device
21, 42 HTTP transmission/reception unit
22 retrieving unit
23, 47 storage unit
30 additional information distribution device
40, 140, 400, 401 video reception device
41, 141 control unit
43 operation signal reception unit
44, 144 video output unit
43 video extraction unit
44, 144 additional information display control unit
45 video input unit
49 reception unit
50L video signal for left eye
50R video signal for right eye
50 3D video signal
51 additional information
54 displaying unit
65 input unit
66 stereoscopic signal generator
81 content
82, 84 fingerprint
83 analysis information
91 video signal
154 video display device
166 video signal generator
410, 420, 430, 440, 450 partial video
411, 421, 431, 451 fingerprint
412, 422, 432, 442 local recognition information
413, 423, 433, 443 mask region
501, 502, 503, 504 video signal

The invention claimed is:

1. A video reception device configured to transmit and receive data through a communication network, the video reception device comprising:
   an input unit configured to receive an input of a video signal of a stereoscopic video, the video signal of a stereoscopic video being transmitted using a first stereoscopic video transmission method that is one of a plurality of stereoscopic video transmission methods;

a video extraction unit configured to extract a partial video for video recognition processing, from the video signal, the partial video having a predetermined time duration or a predetermined number of frames;

a video signal generator configured to generate, from the partial video, another partial video using at least one stereoscopic video transmission method different from the first stereoscopic video transmission method of the stereoscopic video; and a control unit configured to perform control of:
generating a plurality of pieces of content recognition information from all of the partial video and the another partial video,
transmitting the content recognition information to a video recognition device connected to the communication network so as to request the video recognition device to perform video recognition processing,
obtaining a result of the video recognition processing from the video recognition device, and
obtaining additional information based on the result of the video recognition processing from an additional information distribution device connected to the communication network.

2. The video reception device according to claim 1, further comprising a displaying unit configured to display a video obtained by superimposing the additional information on the video signal.

3. The video reception device according to claim 1, wherein
the video signal generator is configured to generate a partial 2D (2 Dimensional) video, too, from the partial video, and
the control unit is configured to generate the content recognition information from each of the partial video, the another partial video and the partial 2D video.

4. The video reception device according to claim 1, wherein the control unit is configured to set different regions for the partial video and the another partial video, and generate the content recognition information for each of the regions.

5. A video recognition method of a video reception device configured to transmit and receive data through a communication network, the video recognition method comprising:
extracting a partial video for video recognition processing, from a video signal of a stereoscopic video input from an outside, the partial video having a predetermined time duration or a predetermined number of frames, and the video signal of a stereoscopic video being transmitted using a first stereoscopic video transmission method that is one of a plurality of stereoscopic video transmission methods;
generating, from the partial video, another partial video using at least one stereoscopic video transmission method different from the first stereoscopic video transmission method of the stereoscopic video;
generating a plurality of pieces of content recognition information from all of the partial video and the another partial video;
transmitting the content recognition information to a video recognition device connected to the communication network so as to request the video recognition device to perform the video recognition processing, and obtaining a result of the video recognition processing from the video recognition device; and
obtaining additional information based on the result of the video recognition processing, from an additional information distribution device connected to the communication network.

6. The video recognition method according to claim 5, further comprising displaying, on a displaying unit, a video obtained by superimposing the additional information on the video signal.

7. The video recognition method according to claim 5, further comprising generating a partial 2D (2 Dimensional) video from the partial video,
wherein the content recognition information is generated from each of the partial video, the another partial video and the partial 2D video.

8. The video recognition method according to claim 5, further comprising setting different regions to each of the partial video and the another partial video,
wherein the content recognition information is generated for each of the regions.

9. An additional information display system which comprises a video reception device, a video recognition device, and an additional information distribution device, the devices being configured to transmit and receive data to each other through a communication network,
wherein the video reception device includes:
an input unit configured to receive an input of a video signal of a stereoscopic video, the video signal of a stereoscopic video being transmitted using a first stereoscopic video transmission method that is one of a plurality of stereoscopic video transmission methods;
a video extraction unit configured to extract a partial video for video recognition processing, from the video signal, the partial video having a predetermined time duration or a predetermined number of frames;
a video signal generator configured to generate, from the partial video another partial video using at least one stereoscopic video transmission method different from the first stereoscopic video transmission method of the stereoscopic video; and
a control unit configured to perform control of:
generating a plurality of pieces of content recognition information from all of the partial video and the another partial video,
transmitting the content recognition information to the video recognition device through the communication network so as to request the video recognition device to perform video recognition processing,
obtaining a result of the video recognition processing from the video recognition device through the communication network, and
obtaining additional information based on the result of the video recognition processing from the additional information distribution device through the communication network,
wherein the video recognition device is configured to perform the video recognition processing on the content recognition information received through the communication network, and transmit the result of the video recognition processing to the video reception device through the communication network, and
wherein the additional information distribution device is configured to transmit the additional information corresponding to the result of the video recognition processing received through the communication network, to the video reception device through the communication network.

\* \* \* \* \*